United States Patent
Ulmer et al.

(10) Patent No.: US 7,471,813 B2
(45) Date of Patent: Dec. 30, 2008

(54) SYSTEMS AND METHODS FOR CORRECTION OF SCATTER IN IMAGES

(75) Inventors: Waldemar Ulmer, Baden (CH); Wolfgang Kaissl, Wil/Zunich (CH)

(73) Assignee: Varian Medical Systems International AG, Zug (CH)

( * ) Notice: Subject to any disclaimer, the term of this patent is extended or adjusted under 35 U.S.C. 154(b) by 293 days.

(21) Appl. No.: 10/956,623

(22) Filed: Oct. 1, 2004

(65) Prior Publication Data

US 2006/0072803 A1    Apr. 6, 2006

(51) Int. Cl.
G06K 9/52    (2006.01)
(52) U.S. Cl. .................. 382/128; 382/131; 382/133; 382/279
(58) Field of Classification Search .............. 382/131, 382/133, 279
See application file for complete search history.

(56) References Cited

U.S. PATENT DOCUMENTS

| | | | | |
|---|---|---|---|---|
| 5,905,809 | A * | 5/1999 | Timmer | 382/131 |
| 6,104,777 | A * | 8/2000 | Darboux et al. | 378/62 |
| 6,507,633 | B1 | 1/2003 | Elbakri et al. | |
| 6,633,626 | B2 | 10/2003 | Trotter et al. | |
| 6,798,860 | B1 * | 9/2004 | Hsieh et al. | 378/4 |

OTHER PUBLICATIONS

Bones, P. J. et al., "Image Recovery from irregularly located spectral smaples", Oct. 7-10, 2001, IEEE, vol. 1, p. 217.*
Baggeroer, A., "A state-variable approach to the solution of Fredholm integral equations", Sep. 1969, IEEE, vol. 15, p. 557.*
International Search Report, Mar. 16, 2006 (PCT/US2005/35160) (Publication No. WO/2006/039471A3).
W. Ulmer, "On the application of stochastic partition functions for the computation of lateral profiles and depth doses in radiotherapy", Strahlentherapie & Onkologie (1982)158:305-311.
W. Ulmer, "On the application of stochastic partition functions in radiotherapy II: modifications of intensity and depth dose profiles by wedge filters", Strahlentherapie & Onkologie (1983)159:559-566.
Ulmer, W. et al., "The inverse problem of a Gussian convolution and its application to the finite size of the measurement chambers/detectors in photon and proton dosimetry" Phys. Med. Biol. (2003) 48:1-20.
Ulmer, W. et al., "A 3D photon superposition/convolution algorithm and its foundation on results of Monte Carlo calculations" Physics in Medicine and Biology (2005) 50:1767-1790.

* cited by examiner

*Primary Examiner*—Jingge Wu
*Assistant Examiner*—John W Lee
(74) *Attorney, Agent, or Firm*—Vista IP Law Group LLP

(57) ABSTRACT

A method for correction of scatter in an image includes receiving data of an image having a scatter characteristic, performing a deconvolution procedure on the data using Hermite expansion technique, and generating modified image data based on a result from the step of performing. A method for correction of scatter in an image includes receiving data of an image having a scatter characteristic, and generating modified image data using Fredholm integral technique.

24 Claims, 17 Drawing Sheets

SYSTEMS AND METHODS FOR CORRECTION OF SCATTER IN IMAGES

BACKGROUND OF THE INVENTION

1. Field of the Invention

This invention relates generally to systems and methods for correction of scatter in images, and more specifically, to systems and methods for correction of scatter in images using a deconvolution procedure.

2. Background of the Invention

Computed tomography (CT) is an imaging technique that has been widely used in the medical field. In a procedure for computed tomography, an x-ray source and a detector apparatus are positioned on opposite sides of a portion of a patient under examination. The x-ray source generates and directs a x-ray beam towards the patient, while the detector apparatus measures the x-ray absorption at a plurality of transmission paths defined by the x-ray beam during the process. The detector apparatus produces a voltage proportional to the intensity of incident x-rays, and the voltage is read and digitized for subsequent processing in a computer. By taking thousands of readings from multiple angles around the patient, relatively massive amounts of data are thus accumulated. The accumulated data are then analyzed and processed for reconstruction of a matrix (visual or otherwise), which constitutes a depiction of a density function of the bodily section being examined. By considering one or more of such sections, a skilled diagnostician can often diagnose various bodily ailments such as tumors, blood clots, etc.

Computed tomography has found its principal application to examination of bodily structures or the like. When generating CT images, scatter effects due to various sources (such as body tissue with different thicknesses and/or densities, collimator and scintillator scatter, etc.) may be introduced into the images. In order to obtain a CT image with desirable quality, a deconvolution procedure can be performed to remove a scatter effect. For example, Fourier transform technique has been used to determine an inverse kernel $K^{-1}$, where K is the kernel representing a scatter effect on an image data. However, the Fourier transform technique is cumbersome to implement, and may lead to inaccurate result—especially when an image contains noise or other discontinuities. Differential operator expansion technique has also been used. However, such technique is also difficult to implement, and is generally only applicable if the image data can be represented by a smooth function—which may not be desirable and may lead to inaccurate result in some cases.

For the foregoing reason, it would be desirable to have new systems and methods for correcting scatter in images.

SUMMARY OF THE INVENTION

In accordance with some embodiments, a method for correction of scatter in an image includes receiving data of an image having a scatter characteristic, performing a deconvolution procedure on the data using Hermite expansion technique, and generating modified image data based on a result from the step of performing.

In accordance with other embodiments, a system for correction of scatter in an image includes means for receiving data of an image having a scatter characteristic, means for performing a deconvolution procedure on the data using Hermite expansion technique, and means for generating modified image data based on a result from the step of performing.

In accordance with other embodiments, a computer program product that includes a medium usable by a processor is provided. The medium includes a set of stored instructions, an execution of which by the processor causes a process to be performed, the process comprising receiving data of an image having a scatter characteristic, performing a deconvolution procedure on the data using Hermite expansion technique; and generating modified image data based on a result from the step of performing.

In accordance with other embodiments, a method for correction of scatter in an image includes providing an output function representing a feature of an image having a scatter characteristic, determining a correction function using one or more characteristic parameter, and adding the correction function to the output function to determine a resulting function, the resulting function representing a feature of an improved image having a reduced scatter characteristic.

In accordance with other embodiments, a system for correction of scatter in an image includes means for obtaining an output function representing a feature of an image having a scatter characteristic, means for determining a correction function using one or more characteristic parameter, and means for adding the correction function to the output function to determine a resulting function, the resulting function representing a feature of an improved image having a reduced scatter characteristic.

In accordance with other embodiments, a computer program product that includes a medium usable by a processor is provided. The medium includes a set of stored instructions, an execution of which by the processor causes a process to be performed, the process comprising obtaining an output function representing a feature of an image having a scatter characteristic, determining a correction function using one or more characteristic parameter, and adding the correction function to the output function to determine a resulting function, the resulting function representing a feature of an improved image having a reduced scatter characteristic.

In accordance with other embodiments, a method for correction of scatter in an image includes receiving data of an image having a scatter characteristic, and generating modified image data using Fredholm integral technique.

In accordance with other embodiments, a system for correction of scatter in an image includes means for receiving data of an image having a scatter characteristic, and means for generating modified image data using Fredholm integral technique.

In accordance with other embodiments, a computer program product that includes a medium usable by a processor is provided. The medium includes a set of stored instructions, an execution of which by the processor causes a process to be performed, the process comprising receiving data of an image having a scatter characteristic, and generating modified image data using Fredholm integral technique.

In accordance with other embodiments, a method for correction of scatter in an image includes receiving data of an image having a scatter characteristic, performing a deconvolution procedure using a plurality of kernels, and generating modified image data based on a result from the step of performing.

In accordance with other embodiments, a system for correction of scatter in an image includes means for obtaining data of an image having a scatter characteristic, means for performing a deconvolution procedure using a plurality of kernels, and means for generating modified image data based on a result from the step of performing.

In accordance with other embodiments, a computer program product that includes a medium usable by a processor is provided. The medium includes a set of stored instructions, an execution of which by the processor causes a process to be performed, the process comprising obtaining data of an image having a scatter characteristic, performing a deconvolution procedure using a plurality of kernels, and generating modified image data based on a result from the step of performing.

In accordance with other embodiments, a method for correction of scatter in an image includes receiving data of an image having a scatter characteristic, performing a deconvolution procedure on the data without performing division by Fourier-transformed function, and generating modified image data based on a result from the step of performing.

In accordance with other embodiments, a system for correction of scatter in an image includes means for receiving data of an image having a scatter characteristic, means for performing a deconvolution procedure on the data without performing division by Fourier-transformed function, and means for generating modified image data based on a result from the step of performing.

In accordance with other embodiments, a computer program product that includes a medium usable by a processor is provided. The medium includes a set of stored instructions, an execution of which by the processor causes a process to be performed, the process comprising receiving data of an image having a scatter characteristic, performing a deconvolution procedure on the data without performing division by Fourier-transformed function, and generating modified image data based on a result from the step of performing.

Other aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how advantages and objects of the present invention are obtained, a more particular description of the present invention briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS

Figure 1:
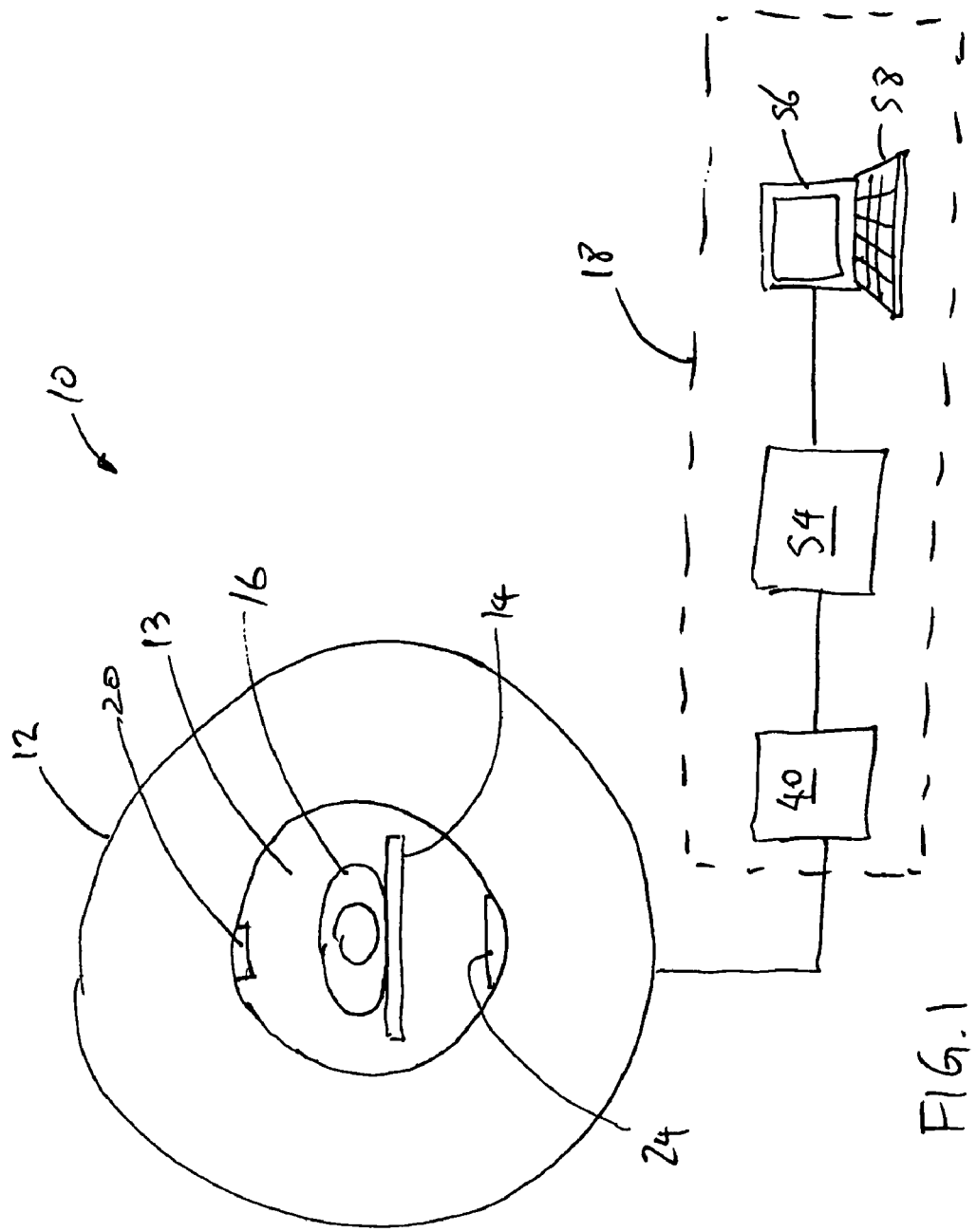
FIG. 1 illustrates a computed tomography system configured to generate images.

Various embodiments of the present invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in any other embodiments of the present invention.

Computed Tomography Image Acquisition System

Referring now to the drawings, in which similar or corresponding parts are identified with the same reference numeral, FIG. 1 illustrates a computed tomography image acquisition system 10, in which embodiments of the present invention can be employed. The system 10 includes a gantry 12 having an opening (or bore) 13, a patient support 14 for supporting a patient 16, and a control system 18 for controlling an operation of the gantry 12. The system 10 also includes an x-ray source 20 that projects a beam of x-rays towards a detector 24 on an opposite side of the gantry 12 while the patient 16 is positioned at least partially between the x-ray source 20 and the detector 24. The x-ray source 20 can be configured to generate a cone beam, or alternatively, a fan beam. The detector 24 has a plurality of sensor elements configured for sensing a x-ray that passes through the patient 16. Each sensor element generates an electrical signal representative of an intensity of the x-ray beam as it passes through the patient 16.

In the illustrated embodiment, the control system 18 includes a processor 54, such as a computer processor, coupled to a gantry rotation control 40. The control system 18 may also include a monitor 56 for displaying data and an input device 58, such as a keyboard or a mouse, for inputting data. During a scan to acquire x-ray projection data (i.e., CT image data), the gantry 12 rotates about the patient 16. The rotation of the gantry 12 and the operation of the x-ray source 20 are controlled by the gantry rotation control 40, which provides power and timing signals to the x-ray source 20 and controls a rotational speed and position of the gantry 12 based on signals received from the processor 54. Although the control 40 is shown as a separate component from the gantry 12 and the processor 54, in alternative embodiments, the control 40 can be a part of the gantry 12 or the processor 54.

During a radiation procedure, the x-ray source 20 generates and directs a x-ray beam towards the patient 16, while the detector 24 measures the x-ray absorption at a plurality of transmission paths defined by the x-ray beam during the process. The detector 24 produces a voltage proportional to the intensity of incident x-rays, and the voltage is read and digitized for subsequent processing in a computer. After image data at different gantry angles have been collected, the collected data are processed for reconstruction of a matrix (CT image), which constitutes a depiction of a density function of the bodily section being examined. By considering one or more of such sections, a skilled diagnostician can often diagnose various bodily ailments. In some cases, the one or more sections can also be used to perform treatment planning.

Deconvolution Formulations

As discussed previously, scatter effects can be introduced into an image during its generation process. The equation $$\phi(x) = \int K(\sigma_0, u-x)\rho(u)du \tag{1}$$

defines a correspondence between a source (input) function $\rho(u)$ and an image (output) function $\phi(x)$, which is broadened by kernel $K(\sigma_0, u-x)$ according to a characteristic parameter $\sigma_0$. In other words, equation (1) represents a relationship between the output function $\phi(x)$ and the input function $\rho(u)$, where the input function refers to a sharp origin profile, and the output function is "smeared out" by the convolution kernel K. As used in this specification, the term "function" is not limited to formulations having variable(s), and can include non-variables, such as one or more numerical values. In some embodiments, the output function $\phi(x)$ can be obtained using readout from the detector 24, and represents a feature of an image having a scatter characteristic.

The kernel $K(\sigma_0, u-x)$ can be expressed as $$K(\sigma_0, u-x) = \frac{1}{\sqrt{\pi}\,\sigma_0}\exp(-(u-x)^2/\sigma_0^2) \tag{2}$$

The characteristic parameter $\sigma_0$ is associated with a scatter effect due to a scattering source. In some embodiments, the characteristic parameter (or scatter parameter) $\sigma_0$ is associated with a scatter effect due to a thickness or a density of an object for which image data is obtained. In other embodiments, the characteristic parameter $\sigma_0$ is associated with a scatter effect due to a collimator that is used to generate the image data (i.e., the scatter effect due to the collimator restricting an active area of detectors and protecting other areas is to be excluded from image processing). The characteristic parameter $\sigma_0$ can be determined experimentally, such as, by performing a Monte Carlo simulation, or empirically.

The extension of equation (2) to two dimension is:

$$K(\sigma_0, u-x) = \left(\frac{1}{\sqrt{\pi}\,\sigma_0}\right)^2 \exp(-((u-x)^2 + (v-y)^2)/\sigma_0^2) \tag{3}$$

with the 2D-convolution represented by:

$$\phi(x,y) = \int K(\sigma_0, u-x, v-y)\rho(u,v)dudv \tag{4}$$

Although one Gaussian kernel for convolution has been described, in some embodiments, a convolution can be subjected to a sum of two or more Gaussian kernels with different scatter functions $\sigma_0, \sigma_1, \sigma_2$. Each of these scatter functions may depend on one or more parameters (e.g. they may depend on z, if the convolution is performed in the x/y-plane). In the case of three different scatter functions $\sigma_0, \sigma_1$ and $\sigma_2$, and corresponding weights (or components) of the kernels $c_0, c_1$ and $c_2$, the convolution kernel K can be expressed as follows:

$$K(z, u-x, v-y) = c_0(z)K_0(\sigma_0(z), u-x, v-y) + c_1(z)K_1(\sigma_1(yz),$$
$$u-x, v-y) + c_2(z)K_2(\sigma_2(z), u-x, v-y) c_0(z) + c_2(z) = 1 \tag{5}$$

The scatter functions $\sigma_0, \sigma_1$ and $\sigma_2$, and corresponding weights of the kernels $c_0, c_1$ and $c_2$ can be determined experimentally, obtained from tables, or calculated empirically, and their values depend on the nature of the scatter effect being corrected.

The deconvolution procedure of equation (1) has the general form $$\rho(x) = \int K^{-1}(\sigma_0, u-x)\phi(u)du \tag{6}$$

It is the task to determine $\rho(x)$ from a given function $\phi(x)$ or $K^{-1}$ from K. As such, in a deconvolution procedure, the output function $\phi(x)$ is used as an input in order to obtain the input function $\rho(u)$ (or at least an approximation of the input function $\rho(u)$). In accordance with some embodiments of the invention, the inverse kernel $K^{-1}$ can be determined by the equation:

$$K^{-1}(s, u-x) = \tag{7}$$
$$(s\pi^{1/2})^{-1} \sum_{n=0}^{\infty} (-1)^n s^{2n}(n!)^{-1} 2^{-n} d^{2n}\exp(-(u-x)^2/s^2)/dx^{2n}$$

where $s = \sigma_0$. The first term (n=0) is the normalized Gaussian itself, the second term (n=1) is given by the second derivative of a Gaussian, etc. According to the definition of Hermite polynomials and their application in generalized convolutions in non-linear problems, the order of the derivative of a Gaussian provides a corresponding Hermite polynomial. In one practical application, the Gaussian represents a ground state oscillation of a wave packet, the Hermite polynomials represent excitation of higher order oscillations, and the real data (e.g., image signals) can be modeled as a superposition of ground state (Gaussian) and certain excited states (Hermite polynomials). Hermite polynomials, including their definitions and variations, are well known in the art of mathematics, and had been published in "Handbook of Mathematical Functions with Formulas Graphs and Mathematical Tables", by Abramowitz M. and Stegun I. A., 1970 (Washington, D.C.: U.S. National Bureau of Standards).

Since only derivations of even order appear in equation (7), the inverse problem can be summarized as:

$$K^{-1}(s, u-x) = \tag{8}$$
$$\sum_{n=0}^{\infty} c_n(s) H_{2n}((x-u)/s) K(s, x-u)\rho(x) = \int K^{-1}(s, x-u)\varphi(u)du$$

The coefficients $c_n$ are determined by $c_n = (-1)^n s^{2n}/(2^n n!)$. Accordingly, the input function $\rho(x)$ can be determined using the following formulation:

$$p(x) = \qquad (9)$$
$$\varphi(x) + \int \sum_{n=1}^{\infty}(-1)^n s^{2n}(2^n-1)(4^n n!)^{-1} d^{2n}K(s, u-x)/dx^{2n}\varphi(u)du =$$
$$\varphi(x) + \int \sum_{n=1}^{\infty}(-1)^n s^{2n}(2^n-1)(4^n n!) -$$
$$1 H_{2n}((x-u)/s)K(s, x-u)\varphi(u)du$$

Since by the differentiations of the Gaussian kernel K(s, u−x) the already introduced Hermite polynomials result, formula (9) may also be written in the same manner as equation (8). The advantage of formula (9) is that ρ(x) is determined by adding φ(x) and correction term(s), where the correction term(s) are themselves determined from convolutions of φ(x).

The Hermite expansions of the inverse kernel $K^{-1}(s, x-u)$ according to equations (8) and (9) are easy to implement, and can generate accurate results—even in the cases when an image contains noise or other discontinuities. Also, the Hermite expansion technique does not require use of special functions, and works with respect to any prescribed functions, such as analytical functions, smooth functions, and numerical input functions. In addition, because the Hermite expansion technique does not require division by Fourier-transformed image function, the result represented by the solution does not increase in noise. As such, using the Hermite expansion technique to correct scatter in images is advantageous over existing techniques. As used in this specification, the term "Hermite expansion technique" refers to any procedure that involves using a variable determined using an order of the derivative of a Gaussian, or a variation thereof.

Several examples of solutions to the inverse kernel problem using the Hermite expansion technique will now be described. However, those skilled in the art understand that the techniques and methods described herein can be used to obtain other solutions, depending on the specific application and parameters used in each case.

Deconvolution Using One Gaussian Kernel K

The Gaussian kernel K according to equation (2) is connected with the following deconvolution kernel $K^{-1}$ according to equation (3):

$$K^{-1}(\sigma_0, u-x) = \qquad (10)$$
$$K(\sigma_0, u-x) + \frac{1}{\sqrt{\pi}\,\sigma_0}\sum_{n=1}^{\infty}(-1)^n \frac{\sigma_0^{2n}}{2^n n!}\partial^{2n}\exp(-(x-u)^2/\sigma_0^2)/\partial x^{2n}$$

$K_0^{-1}$ results from a normalized Gaussian:
$\partial^{2n}\exp(-(x-u)^2/\sigma_0^2)/\partial x^{2n}$ are Hermite polynomials $H_{2n}(u-x,\sigma_0)$ $$K^{-1}(\sigma_0, u-x) = K(\sigma_0, u-x) + \qquad (11)$$
$$\frac{1}{\sqrt{\pi}\,\sigma_0}\sum_{n=1}^{\infty}(-1)^n \frac{\sigma_0^{2n}}{2^n n!}H_{2n}(u-x,\sigma_0)K_0(\sigma_0, u-x)$$

The coefficients of Hermite polynomials $H_n(u-x, \sigma_0)$ are:

$$H_n(u-x, \sigma_0) = n!\sum_{m=0}^{N}(-1)^m \frac{1}{m!(n-2m)!}2^{n-2m}((u-x)/\sigma_0^2)^{n-2m}$$

with $N = \frac{n}{2}$ and $n = 2, 4, 6, \ldots$

Figure 2:
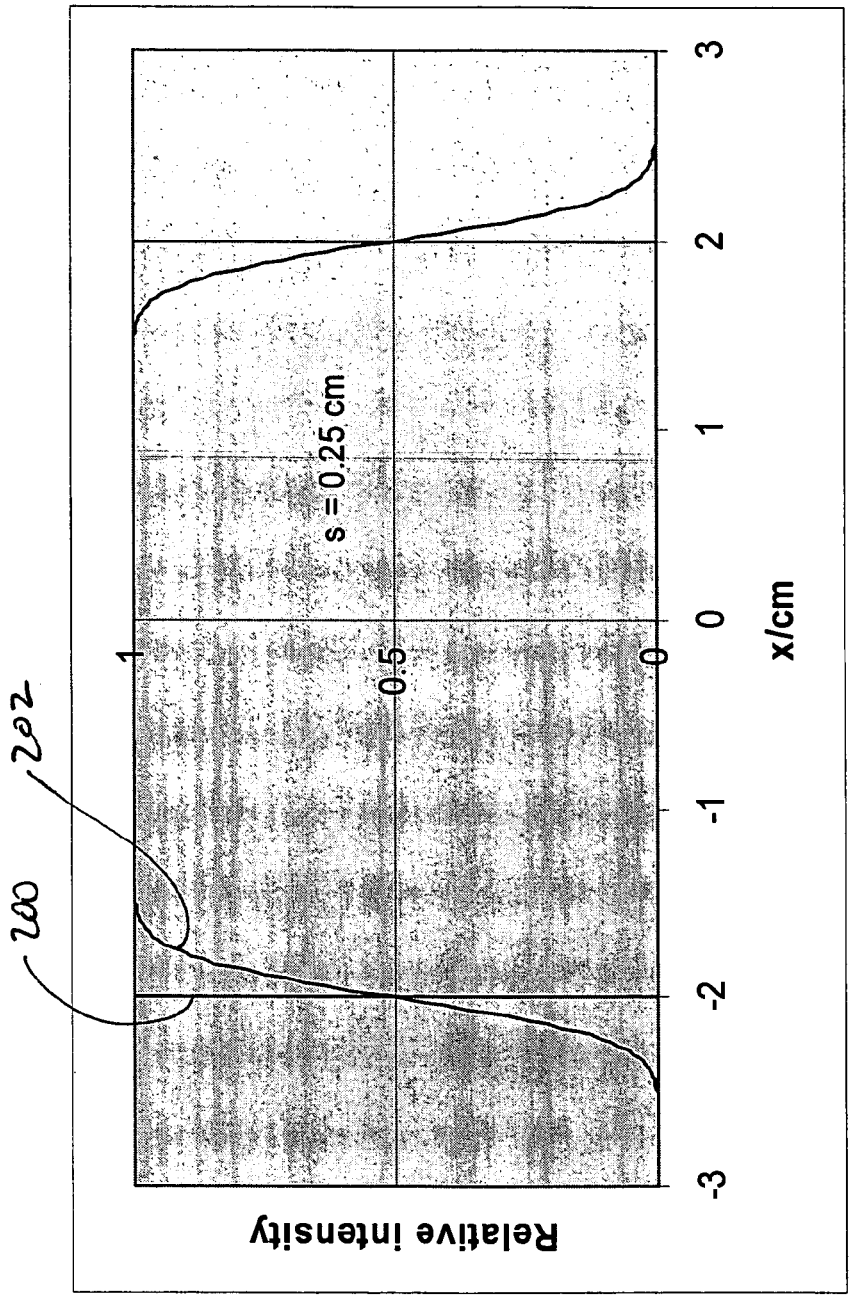
FIG. 2 illustrates an example of a convolution result obtained using one Gaussian kernel.
Figure 3:
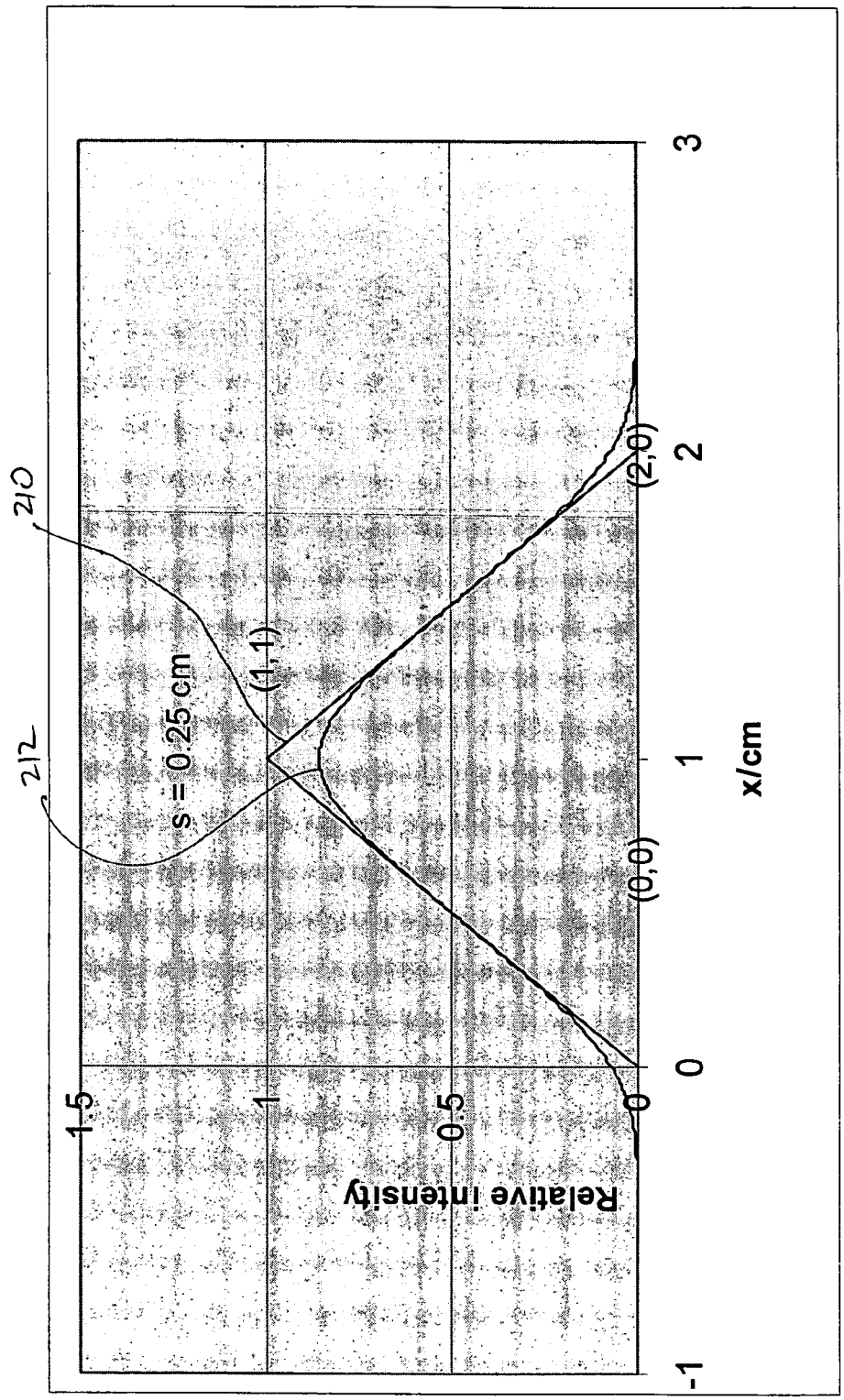
FIG. 3 illustrates another example of a convolution result obtained using one Gaussian kernel.
Figure 4:
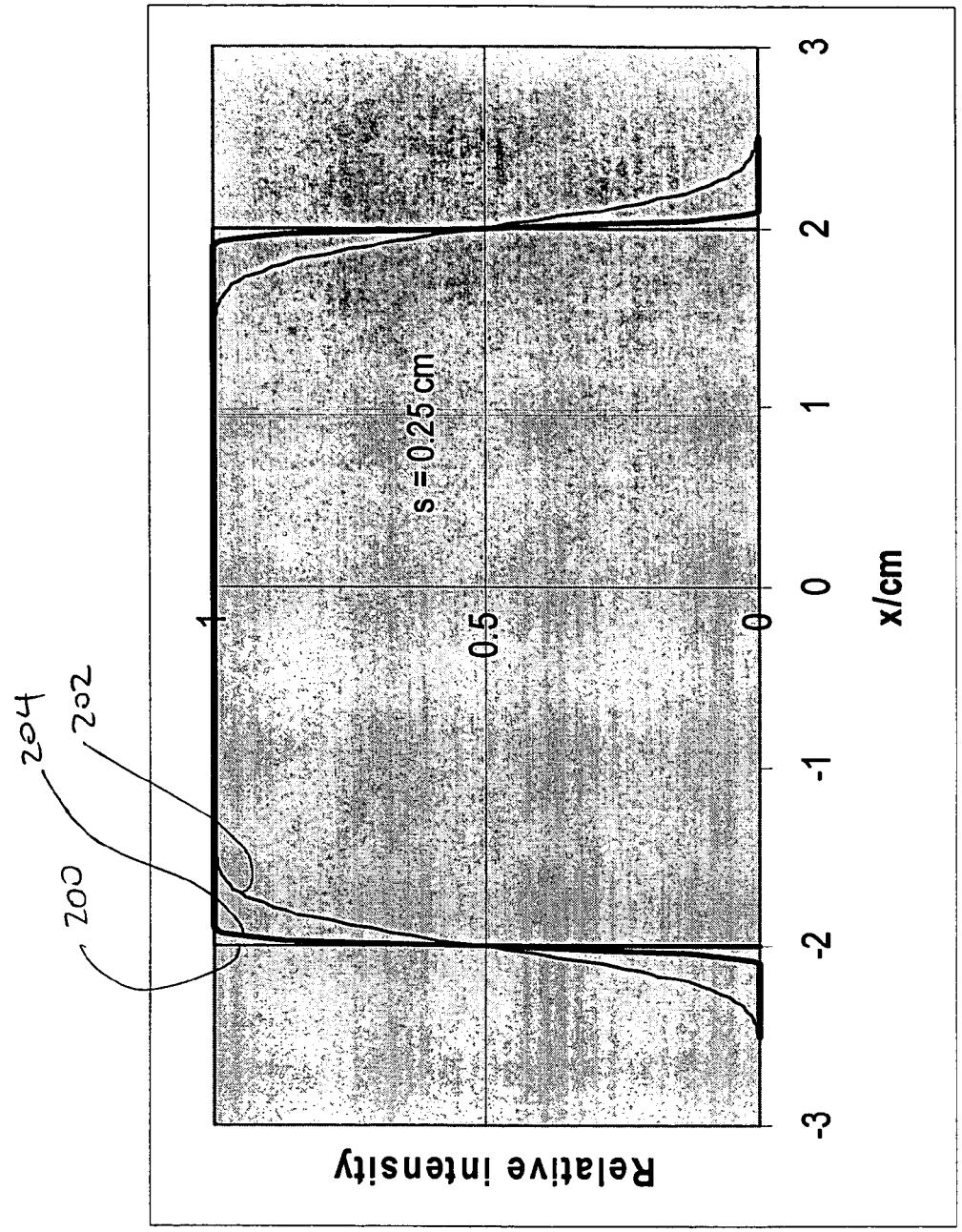
FIG. 4 illustrates an example of a deconvolution solution for the source function of FIG. 2.
Figure 5:
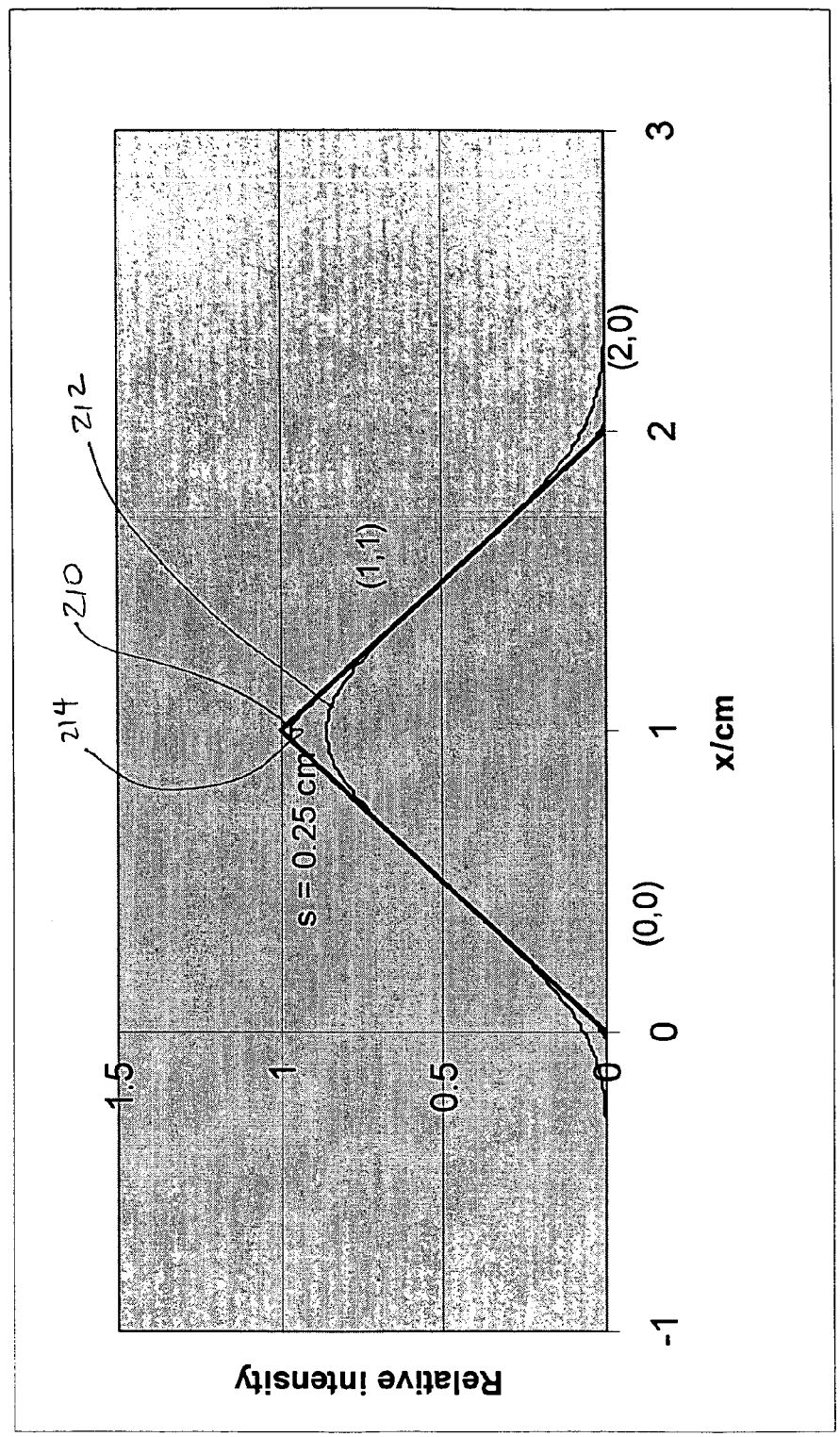
FIG. 5 illustrates an example of a deconvolution solution for the source function of FIG. 3.

In some embodiments, equations (10) and (11) can be used to calculate a deconvolution solution for a source function. FIG. 2 illustrates an example of an "unsmeared" image profile 200 having a square shape together with its corresponding "smeared" image profile 202. FIG. 3 illustrates an example of an "unsmeared" image profile 210 having a triangular shape together with its corresponding "smeared" image profile 212. In some embodiments, the scattered image profile 202, 212 can be calculated using a Gaussian kernel. Alternatively, the scattered image profiles 202, 212 can be obtained using readouts from the detector 24. Although the scattered image profiles 202, 212 approximate the original unsmeared image profiles 200, 210, respectively, the scatter effect at the corner(s) of the profiles 202, 212 are relatively pronounced. FIGS. 4 and 5 illustrate deconvolution solutions for FIGS. 2 and 3, respectively, obtained using equations (10) and (11) with one Gaussian kernel. As shown in the illustrated examples, the scattering effects at the corner(s) of the deconvolved profiles 204, 214 are greatly reduced. As such, performing a deconvolution procedure using Hermite expansion technique significantly can improve a contrast and spatial resolution of an image.

If the deconvolution is performed in x- and/or y-directions (FIG. 1), the parameter $\sigma_0$ can be z-dependent. In some embodiments, the output function φ(x), which represents a feature of a scattered image, is obtained and deconvolved to provide the input function ρ(x) using the following equation:

$$p(x) = \int K^{-1}(\sigma_0, u-x)\varphi(u)du = \qquad (12)$$
$$\int K(\sigma_0, u-x)\varphi(u)du + \frac{5}{2}N_f\sigma_0\left(\frac{u-x}{\sigma_0}\right)$$
$$\exp(-(u-x)^2/\sigma_0^2)\begin{bmatrix}\text{upper boundary}\\\text{lower boundary}\end{bmatrix}\varphi(u_0),$$
$$u_0 = \frac{u_{lower}+u_{upper}}{2} - N_f\sigma_0\left(\frac{u-x}{\sigma_0}\right)^3$$
$$\exp(-(u-x)^2/\sigma_0^2)\begin{bmatrix}\text{upper boundary}\\\text{lower boundary}\end{bmatrix}\varphi(u_0),$$
$$u_0 = \frac{u_{lower}+u_{upper}}{2}$$

where $$N_f = \frac{1}{\sqrt{\pi}\,\sigma_0}$$

is a normalization factor.

Since the above formula for Hermite polynomials contains the argument $((u-x)/\sigma_0^2)^{n-2m}$, it is convenient to perform the following substitutions: P=n−2m and p=(u−x)/$\sigma_0$. Then the integration over du yields du=$\sigma_0$dp, and the following equation is obtained:

$$\int ((u-x)/\sigma_0^2)^p \exp(-(u-x)^2/\sigma_0^2) du = \sigma_0 \frac{1}{\sigma_0^p} \int \rho^p \exp(-\rho^2) d\rho$$

Next, the following equation is obtained by the above substitution and recursive integration:

$$\sigma_0 \frac{1}{\sigma_0^p} \int \rho^p \exp(-\rho^2) d\rho =$$
$$-\sigma_0 \frac{1}{\sigma_0^p} \exp(-\rho^2)(2^{-1}\rho^{p-1} + 2^{-2}(p-1)\rho^{p-3} + 2^{-3}(p-1)(p-3)\rho^{p-5} +$$
$$2^{-4}(p-1)(p-3)(p-5)\rho^{p-7} +$$
$$2^{-(q+1)/2}(p-1)(p-3)(p-5) \ldots (p-q-2)\rho^{p-q} + \ldots )$$

If $q=p-1$ then only the Gaussian remains:

$$2^{-p/2}(p-1)(p-3)(p-5)(p-7)$$
$$(p-9) \ldots (p-q)\sigma_0 \frac{1}{\sigma_0^p} \int \exp(-\rho^2) d\rho$$

With the help of the introduced substitutions for p and $\rho$, the integration procedure with regard to the inverse kernel $K^{-1}(\sigma_0, u-x)$ can be performed by a recursive procedure. In some embodiments, the restriction that the integration boundaries $u_{upper}$ and $u_{lower}$ of the output function $\phi(u)$ satisfies the condition that $\phi(u)$ is constant within the boundary interval is imposed. Then the substitution according to $\rho$ provides:

$u=u_{lower} \Rightarrow \rho_{lower}=(u_{lower}-x)/\sigma_0$ and $u=u_{upper} \Rightarrow \rho_{upper}=(u_{upper}-x)/\sigma_0$.

With the help of these substitutions and restrictions, the above terms assume the shape (or image profile) as follows:

$$\sigma_0 \frac{1}{\sigma_0^p} \int \rho^p \exp(-\rho^2) d\rho \varphi(\sigma_0 \rho - x) = \quad (13)$$
$$-\sigma_0 \frac{1}{\sigma_0^p} \exp(-\rho^2)(2^{-1}\rho^{p-1} + 2^{-2}(p-1)\rho^{p-3} +$$
$$2^{-3}(p-1)(p-3)\rho^{p-5} + 2^{-4}(p-1)(p-3)(p-5)\rho^{p-7} +$$
$$2^{-(q+1)/2}(p-1)(p-3)(p-5) \ldots (p-q-2)\rho^{p-q} + \ldots )$$
$$\varphi(\sigma_0 \rho - x) \Big| \text{(boundaries: at } \rho_{upper} \text{ and at } \rho_{lower})$$

If $q=p-1$ then only the Gaussian kernel remains:

$$2^{-p/2}(p-1)(p-3)(p-5)(p-7)$$
$$(p-9) \ldots (p-q)\sigma_0 \frac{1}{\sigma_0^p} \int \exp(-\rho^2) d\rho$$

Inverse Kernel of Two Gaussian Kernels with $c_0>c_1$, and $c_0>0.5$

The following procedure defines the inverse kernel of the Gaussian convolution according to equation (6). Starting-point is the deconvolution of the $K_0$-kernel according to the technique discussed previously.

$$K_{inv}^{-1}(u-x) = \frac{1}{c_0} K_0^{-1}(\sigma_0, u-x) + \quad (14)$$
$$\frac{1}{c_0} \sum_{n=1}^{\infty} (-1)^n \left(\frac{c_1}{c_0}\right)^n K_1(n\sigma_1^2 - (n+1)\sigma_0^2, u-x)$$

where $$K_1(n\sigma_1^2 - (n+1)\sigma_0^2, u-x) = \quad (14a)$$
$$\frac{1}{\sqrt{\pi}\sqrt{n\sigma_1^2 - (n+1)\sigma_0^2}} \exp(-(u-x)^2/(n\sigma_1^2 - (n+1)\sigma_0^2))$$

The above equation contains the inverse kernel of $K_0(\sigma_0, x-u)$, which is $K_0^{-1}(\sigma_0, u-x)$. It should be noted that the kernel $K_0(\sigma_0, x-u)$ always satisfies $K_0(\sigma_0, x-u)=K_0(\sigma_0, u-x)$ because it is symmetrical. If the parameter $\sigma_0$ is very small, we can replace the kernel by a $\delta$-function. If the deconvolution procedure of $K_0^{-1}$ is included, then the calculation is already performed—i.e., the source and image function are identical.

In some embodiments, $\sigma_0$ and $\sigma_1$ can be functions of z, and the restrictions that $\sigma_0<\sigma_1$, $c_0>c_1$, and $c_1(z)=1-c_0(z)$ are imposed. The above equation with $K_{inv}^{-1}(u-x)$ can be applied in the following way:

$$\rho(x) = \frac{1}{c_0} \int K_0^{-1}(\sigma_0, u-x) \varphi(u) du + \quad (15)$$
$$\int \frac{1}{c_0} \sum_{n=1}^{\infty} (-1)^n \left(\frac{c_1}{c_0}\right)^n K_1(n\sigma_1^2 - (n+1)\sigma_0^2, u-x) \varphi(u) du$$

In the illustrated embodiments, $\phi(x)$ can be determined using readouts from the detector 24, and $\rho(x)$, which represents an approximation of an original image (i.e. the source, where no scatter is present), is determined by performing a deconvolution procedure using any of the above equations/techniques. This source function $\rho(x)$ refers to that image, where the contrast and spatial resolution have reached an optimum.

Inverse Kernel of Three Gaussian Kernels with $c_0>c_1$ and $c_0>c_2$

In some embodiments, a deconvolution procedure can involve three Gaussian kernels. In such cases, the deconvolution procedure would include solving $\sigma_0$, $\sigma_1$, $\sigma_2$. In some embodiments, the condition that $c_0>>c_1$ and $c_1>c_2$ can be imposed to simplify calculation. Then we can consider from an order 3 the term referring to $c_2$ as a perturbation in the sense of an operator expansion technique, i.e. the terms of the order $n>3$ provide a very small contribution. $\sigma_0$, $\sigma_1$, $\sigma_2$ and $c_0$, $c_1$ and $c_2$ may be functions of z, and the condition that $c_0+c_1+c_2=1$ is imposed. The deconvolution up to first order is:

$$K_{first\ order}^{-1}(u-x) = \frac{1}{c_0} K_0^{-1}(\sigma_0, u-x) - \quad (16)$$
$$\frac{c_1}{c_0^2} K_1(\sigma_1^2 - 2\sigma_0^2, u-x) - \frac{c_2}{c_0^2} K_2(\sigma_2^2 - 2\sigma_0^2, u-x)$$

The deconvolution up to second order is:

$$K_{second\ order}^{-1} = K_{first\ order}^{-1} + \frac{c_1^2}{c_0^3} K_1(2\sigma_1^2 - 3\sigma_0^2, u - x) + \quad (17)$$

$$\frac{c_2^2}{c_0^3} K_2(2\sigma_2^2 - 3\sigma_0^2, u-x) + \frac{2c_1 c_2}{c_0^3} K_{1-2}(\sigma_1^2 + \sigma_2^2 - 3\sigma_0^2, u-x)$$

For higher order terms (n>2), the deconvolution is:

$$K_{higher\ order}^{-1} = K_{second\ order}^{-1} + \quad (18)$$

$$(-1)^n \left( \frac{c_1^n}{c_0^{n+1}} K_1(n\sigma_1^2 - (n+1)\sigma_0^2, u-x) + \frac{c_2^n}{c_0^{n+1}} K_2(n\sigma_2^2 - (n+1)\sigma_0^2, u-x) + \right.$$

$$\left. \frac{1}{c_0^{n+1}} \sum_{j=1}^{n-1} \binom{n-1}{j} c_1^j c_2^{n-1-j} K_{1-2}\left( \binom{n-1}{j} \sigma_1^{2j} + \binom{n-1}{j} \sigma_2^{2j} - (n+1)\sigma_o^2, u-x \right) \right)$$

Equation (18) is valid for every order n and does not contain any restriction.

Expressing the inverse kernel $K^{-1}$ in terms of the original kernels $K_0, K_1, K_2$ is advantageous because it greatly simplifies calculation. In some cases, it is possible to work from a certain order k with two Gaussian kernels. Then from order k, the formula with the inversion of two Gaussian kernels can be obtained. For this purpose, the following variables are defined:

$$\sigma_{1 eff} = \sqrt{\frac{c_1 \sigma_1^2 + c_2 \sigma_2^2}{c_1 + c_2}}$$

and $$c_{1 eff} = c_1 + c_2$$

This definition ensures that $c_0 = 1 - c_1 - c_2$. Then the above formula can be modified as follows:

$$\rho(x) = \int \frac{1}{c_0} \sum_{n=k}^{\infty} (-1)^n \left( \frac{c_{1 eff}}{c_0} \right)^n K_1(n\sigma_{1 eff}^2 - (n+1)\sigma_0^2, u-x)\varphi(u)\,du + \quad (19)$$

Convolution terms up to order $k-1$

The convolution terms up to order k−1 can be determined using equations (16), (17), and (18). In some embodiments, the order k−1 can be prescribed to be ∞. Note that the kernels $K_1, K_2, K_{1-2}$ are Gaussian kernels with normalization factors $N_f$ according to equation (12), For example, for $K_{1-2}$, we have $N_f = 1/(\sqrt{\pi}\sigma_{effective})$, where $\sigma_{effective}^2 = \sigma_1^2 + \sigma_2^2 - 3\sigma_0^2$.

Fredholm Integral Method for Deconvolution of a Sum of Gaussian Convolution Kernels The general convolution equation with three different Gaussians can be written as $$\rho(x) = (1/c_0)\int K_0^{-1}(\sigma_0, u-x)\phi(u)du - (c_1/c_0)\int K_1(s_1, u-x)\rho(u)du - (c_2/c_0)\int K_2(s_2, u-x)\rho(u)du \quad (20)$$

The parameters $s_1$ and $s_2$ are given by: $s_1^2 = \sigma_1^2 - \sigma_0^2$ and $s_2^2 = \sigma_2^2 - \sigma_0^2$. The deconvolution contribution of the Gaussian kernel with the smallest σ-value (i.e. $\sigma_0$) can be simplified by $$f(x) = (1/c_0)\int K_0^{-1}(\sigma_0, u-x)\phi(u)du \quad (21)$$

Equation (21) acts as a perturbation term, and the kernel $K_0^{-1}$ is the same one as given by equations (10) and (11). Then the expansion of the function ρ(x) and the kernel K in terms of the reproducing functions, i.e. a Gaussian multiplied with Hermite polynomials $P_\beta(x, s_1)$ and $P_\beta(x, s_2)$ is:

$$\rho(x) = \sum_{l=1}^{2} \sum_{\beta=1}^{N} a_\beta P_\beta(s_l, x) \quad (22)$$

$$P_\beta(s_l, x) = H_\beta(s_l, x)\exp(-x^2/s_l^2)$$

This provides:

$$q_\beta = \int f(x)P_\beta(x)dx$$

$$A_{\beta\beta'} = -(c_1/c_0)\int P_\beta(u)K_1(u-x)P_{\beta'}(x)du\,dx \quad (23)$$

The task now is to solve a linear system of equations $$a_\beta - \sum_{\beta'} A_{\beta\beta'} a_{\beta'} = q_\beta \quad (24)$$

The solution procedure of equation (24) includes determining the integrals of equation (23), and obtaining a solution for the system of linear equations (e.g., in matrix form) to obtain $a_\beta$. The result can then be used in equation (22) to obtain the source function p(x).

It should be noted that the use of Fredholm integral technique to obtain the source function p(x) is advantageous because all Hermite polynomials are in a positive sense (i.e., there is no toggling of signs). Also, the Fredholm integral technique allows the source function p(x) to be positively determined—i.e., without using an iterative process where the $n^{th}$ term is used to determine the $n+1^{th}$ term. The integral kernel of a Fredholm integral equation with sums of Gaussian kernels can readily be solved by a summation of Hermite polynomials.

Figure 6:
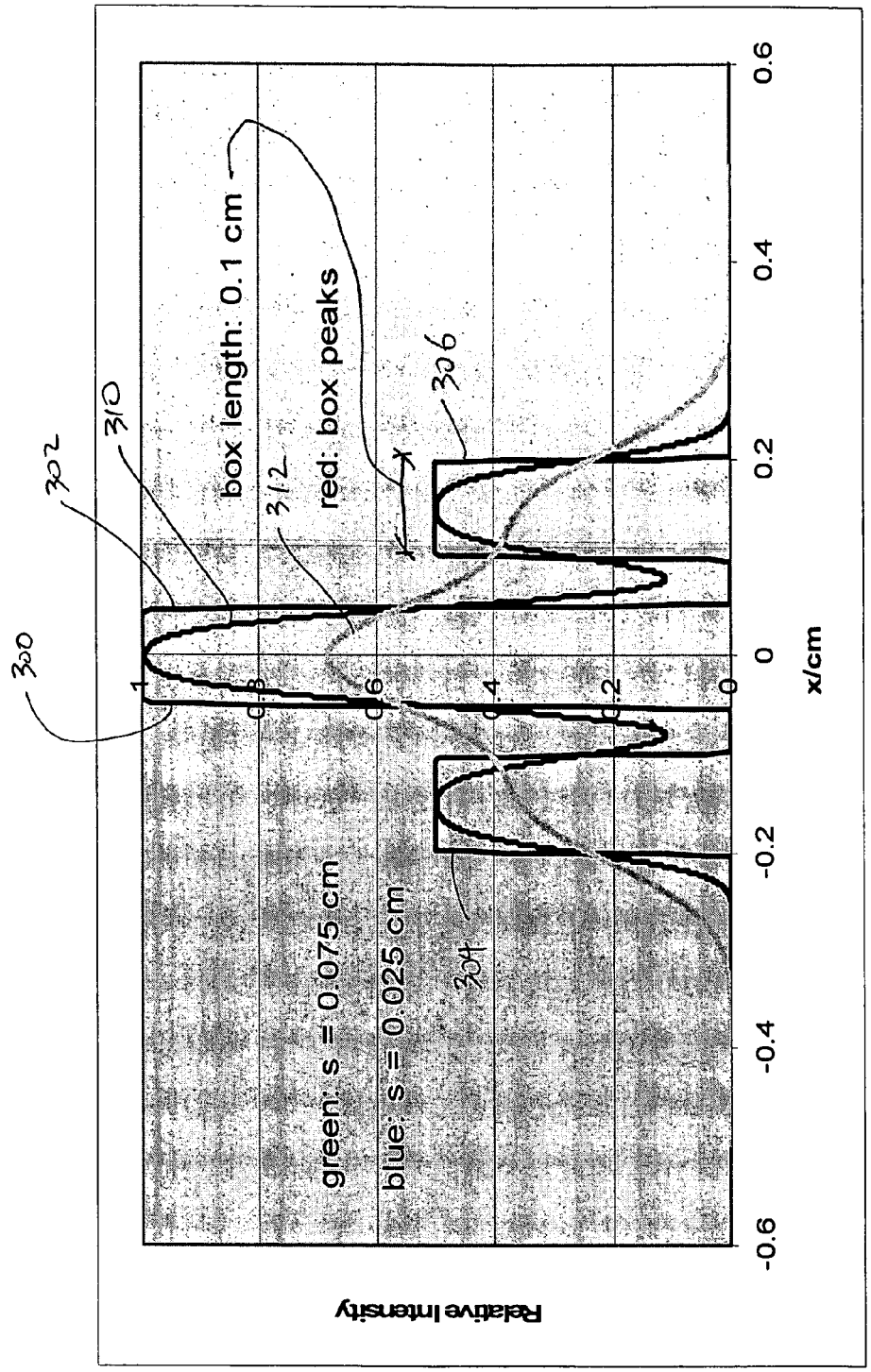
FIG. 6 illustrates an example of a convolution of a three-box profile using different s-values.
Figure 7:
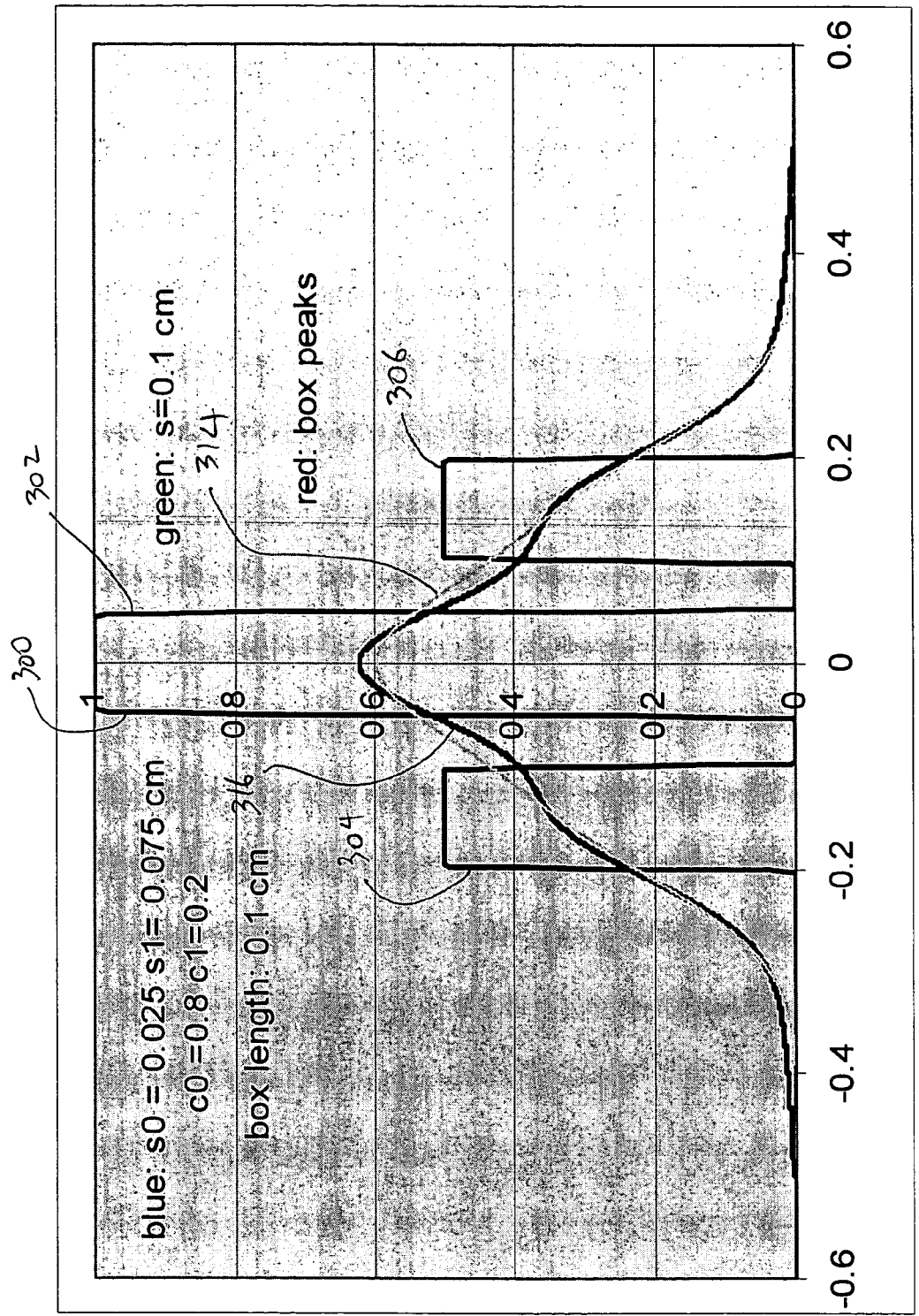
FIG. 7 illustrates an example of a convolution of a three-box profile using different s-values and two Gaussian kernels.
Figure 8:
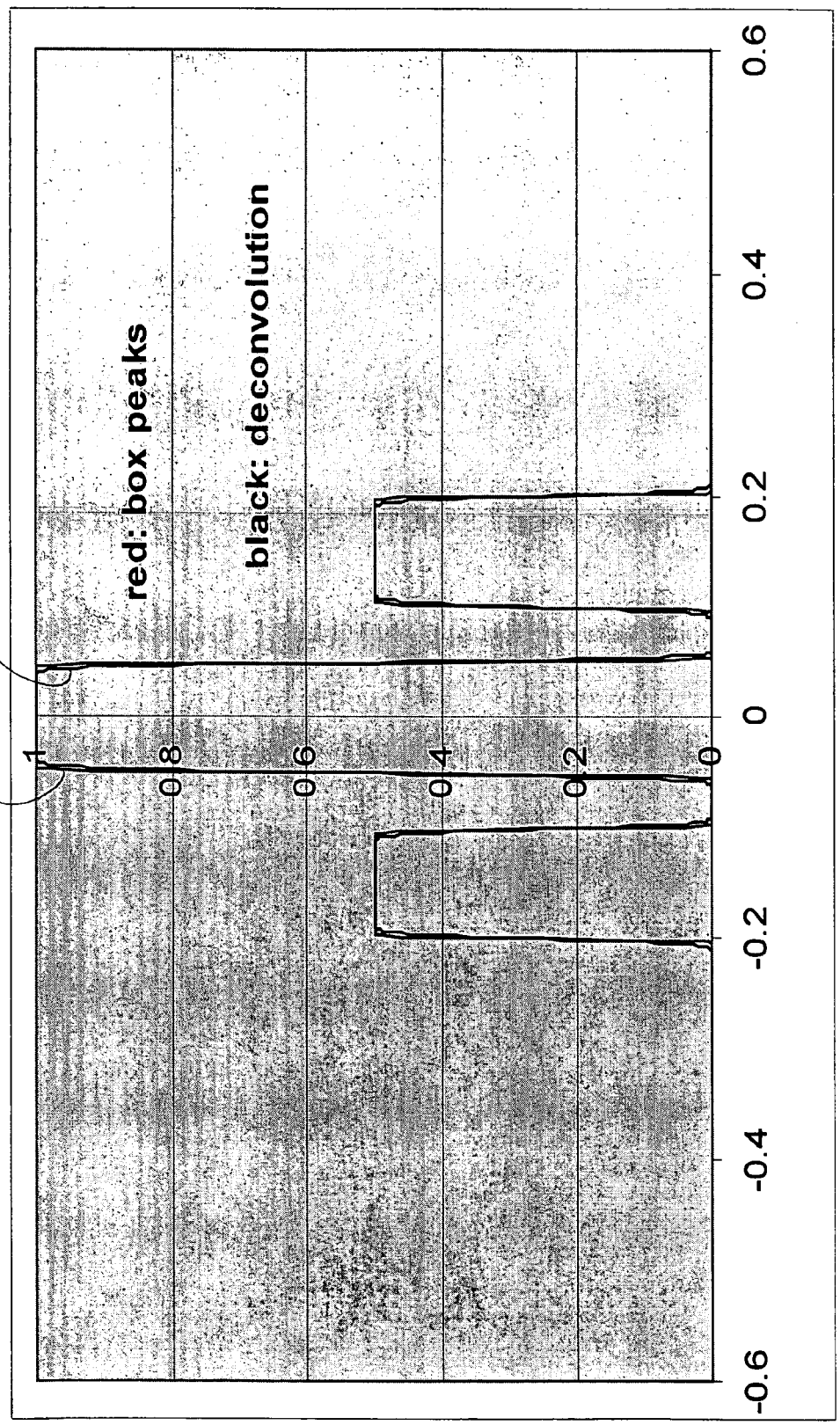
FIG. 8 illustrates an example of a deconvolution solution for the source function of FIGS. 6 and 7.

The Hermit expansion technique and the Fredholm integral technique described previously can be used to remove scatter in images resulted from various scatter sources. In some embodiments, techniques described herein can be used to perform deconvolution of a fluence profile of a machine. For example, the scatter produced by a multileaf collimator (MLC) can be reduced using any of the techniques described herein. FIGS. 6 and 7 illustrate examples of convolution of a three-box profile 300 using different parameters. The three-box profile 300 has three peaks 302, 304, 306 with spacing there between, and each of the three peaks 302, 304, 306 has a box length of 0.1 cm. The three-box profile 300 represents a configuration of a MLC. As shown in FIG. 6, the first convolved curve 310 is obtained using a scatter parameter s=0.025, and the second convolved curve 312 is obtained using a scatter parameter s=0.075. In FIG. 7, the first convolved curve 314 is obtained using a scatter parameter s=0.1, and the second convolved curve 316 is obtained using two kernels (with scatter parameters of 0.025 and 0.075 and corresponding weights of 0.8 and 0.2). Alternatively, the convolved (or scattered) profiles 310, 312, 314, 316 can be obtained using readouts from the detector 24. As shown in the figures, the scattered image profiles 310, 312, 314, 316 deviate from the original three-box profile 300. FIG. 8 illustrates an example of a deconvolution solution for the source function of FIGS. 6 and 7. As shown in FIG. 8, the corrected/ deconvolved profile 310 (representing the deconvolution solution for different kinds of scatter effects) substantially resembles the original three-box profile 300 (input function)—indicating that a scatter effect due to a collimator leaf is substantially reduced.

Figure 9:
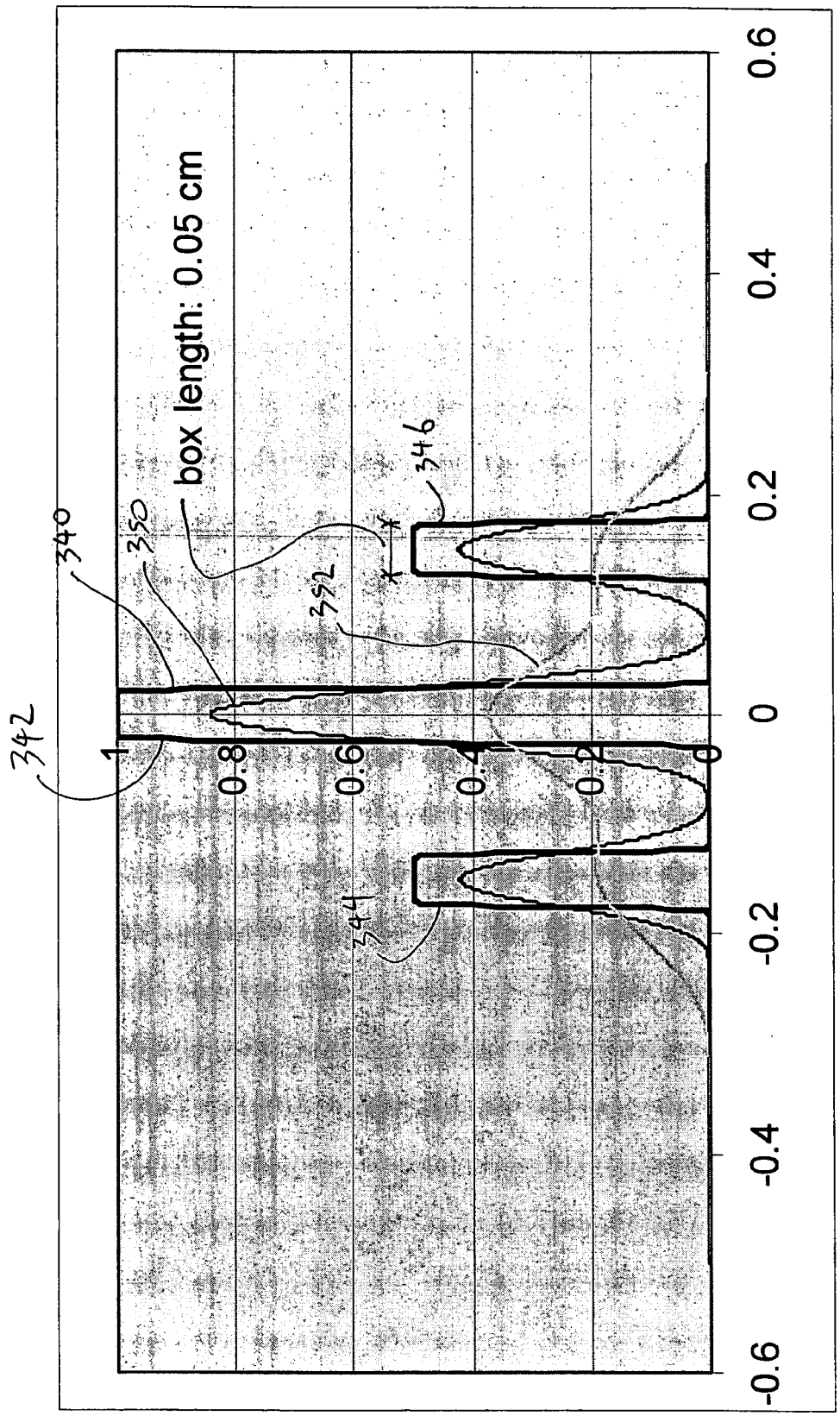
FIG. 9 illustrates an example of a convolution of another three-box profile, created using the parameters of FIG. 6.
Figure 10:
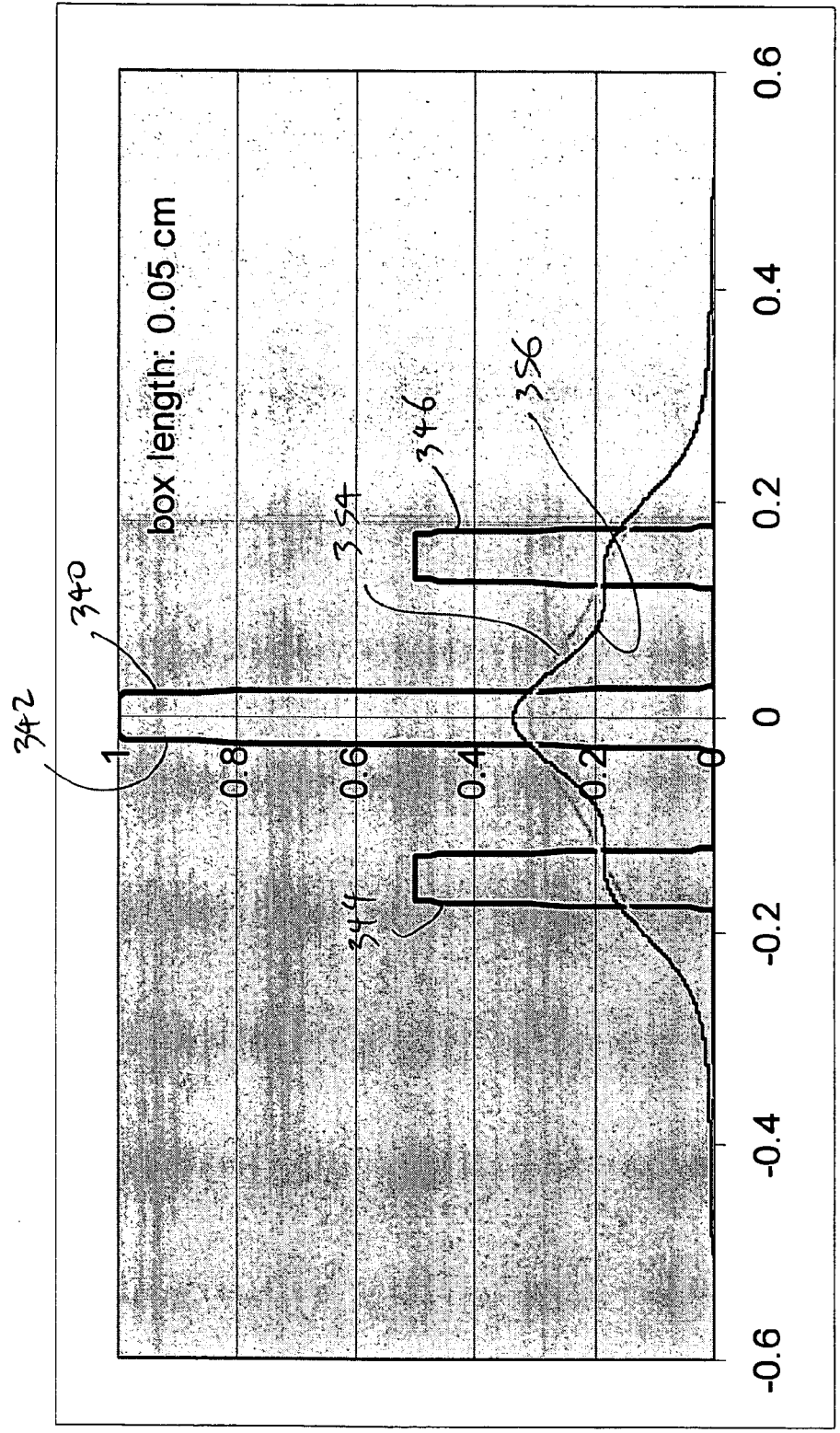
FIG. 10 illustrates an example of a convolution of the three-box profile of FIG. 9, created using the parameters of FIG. 7.
Figure 11:
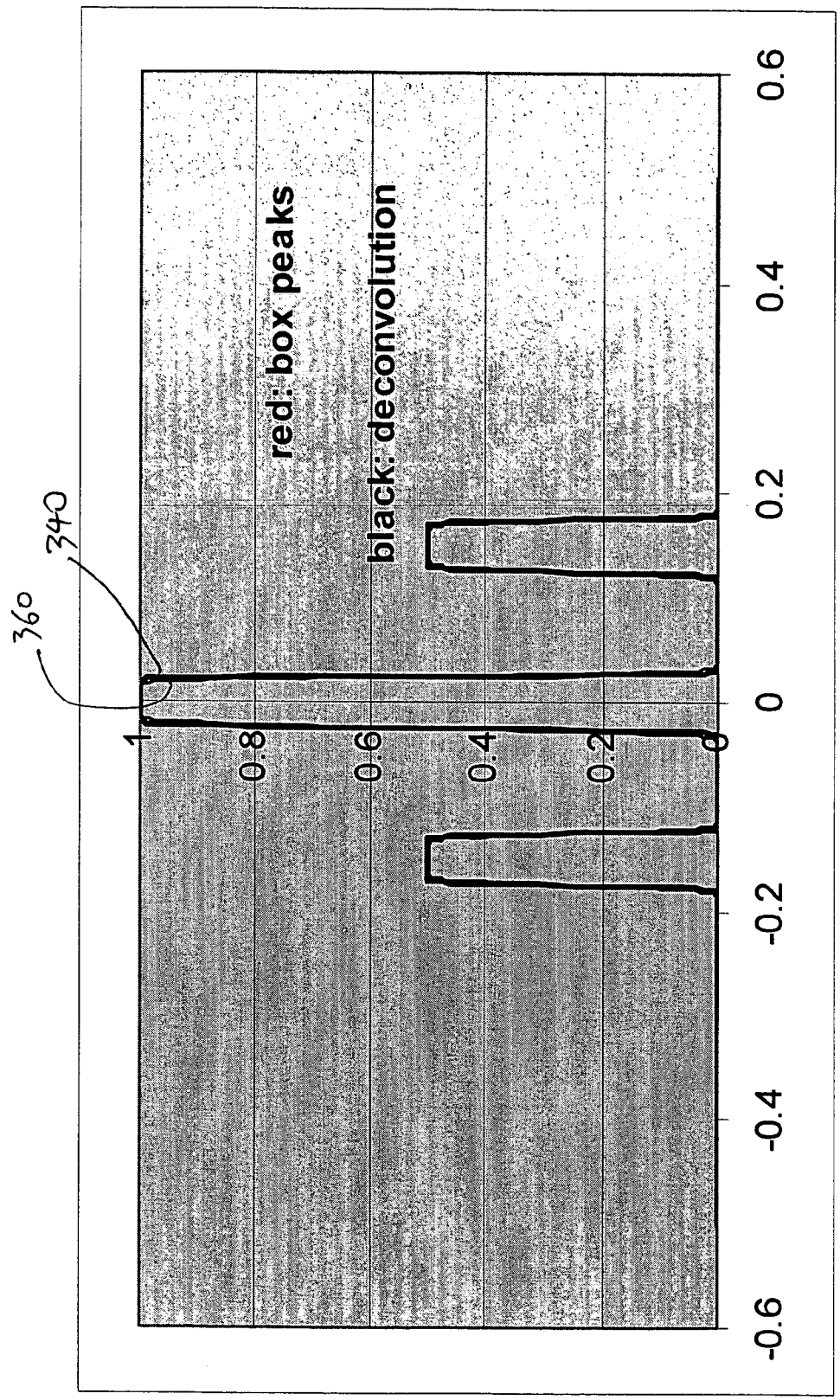
FIG. 11 illustrates an example of a deconvolution solution for the source function of FIGS. 9 and 10.

FIGS. 9-11 illustrate a similar result as that of FIGS. 6-8, but using a three-box profile 340 having different dimensions from that of FIG. 6. The three-box profile 340 has three peaks 342, 344, 346 with spacing there between, and each of the three peaks 342, 344, 346 has a box length of 0.05 cm. As shown in the figures, convolved profiles 350, 352, 354, 356 are obtained using different scatter parameters. Alternatively, the convolved (or scattered) profiles 350, 352, 354, 356 can be obtained using readouts from the detector 24. As shown in the figures, the scattered image profiles 350, 352, 354, 356 deviate from the original three-box profile 340. FIG. 11 illustrates an example of a deconvolution solution for the source function of FIGS. 9 and 10. As shown in FIG. 11, the corrected/deconvolved profile 360 (representing the deconvolution solution) substantially resembles the original three-box profile 340 (input function)—indicating that a scatter effect due to a collimator leaf is substantially reduced.

Figure 12:
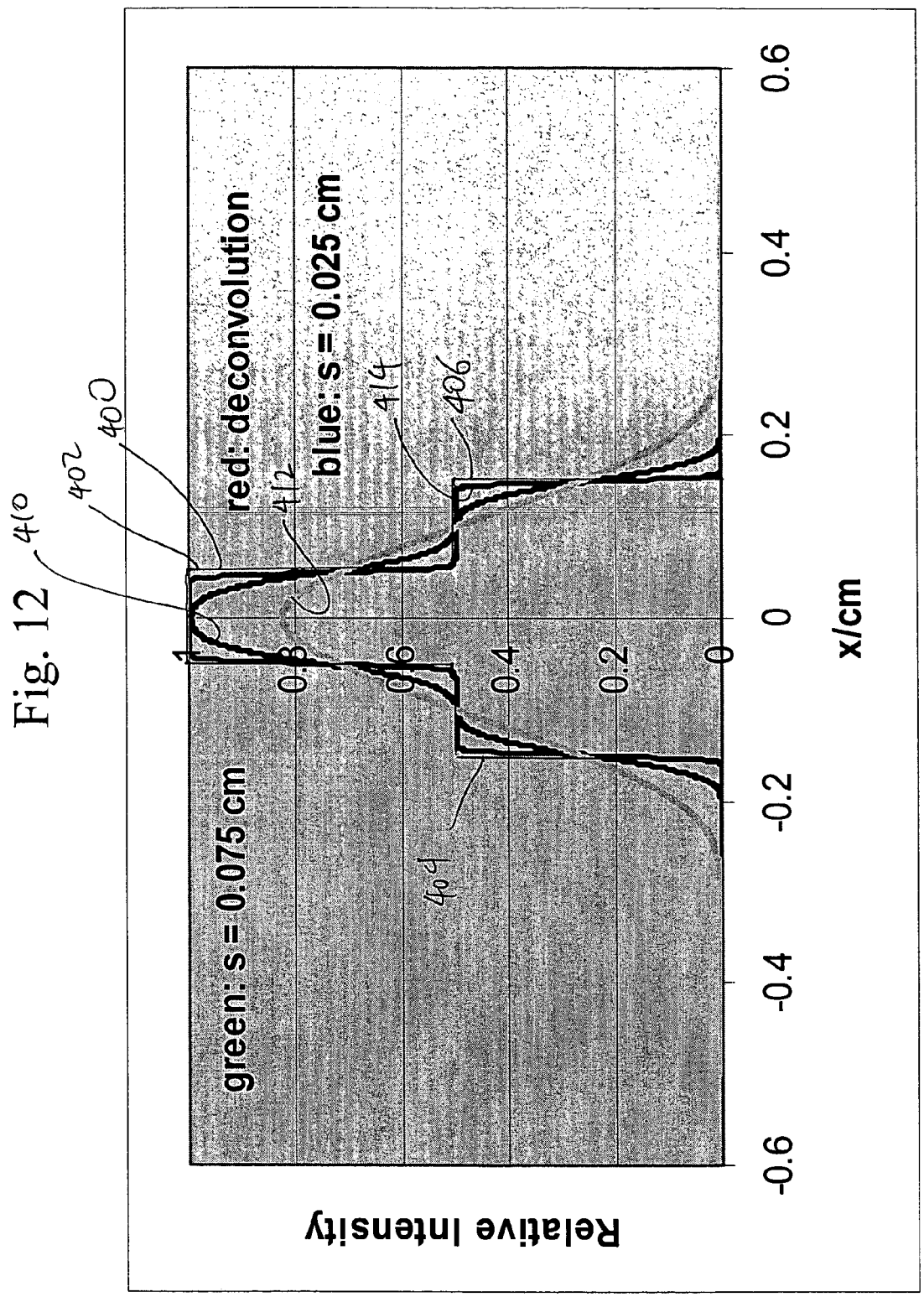
FIG. 12 illustrates examples of a deconvolution solution for another three-box profile, created using different parameters.

It should be noted that the three-box profile should not be limited to the examples discussed previously, and that in alternative embodiments, the box profile can have other configurations (e.g., different number of peaks, different box length for each peak, and/or different peak height) that correspond to particular MLC configurations. Also, in other embodiments, the scattered profile for a MLC can have a different shape from the examples shown previously, depending on a scatter characteristic of the MLC. FIG. 12 illustrates a three-box profile 400 having three peaks 402, 404, 406 with no separation there between. The first scattered curve 410 is obtained using a scatter parameter s=0.025, and the second scattered curve 412 is obtained using a scatter parameter s=0.075. A deconvolved curve 414 obtained using embodiments of the invention is also shown.

Figure 13:
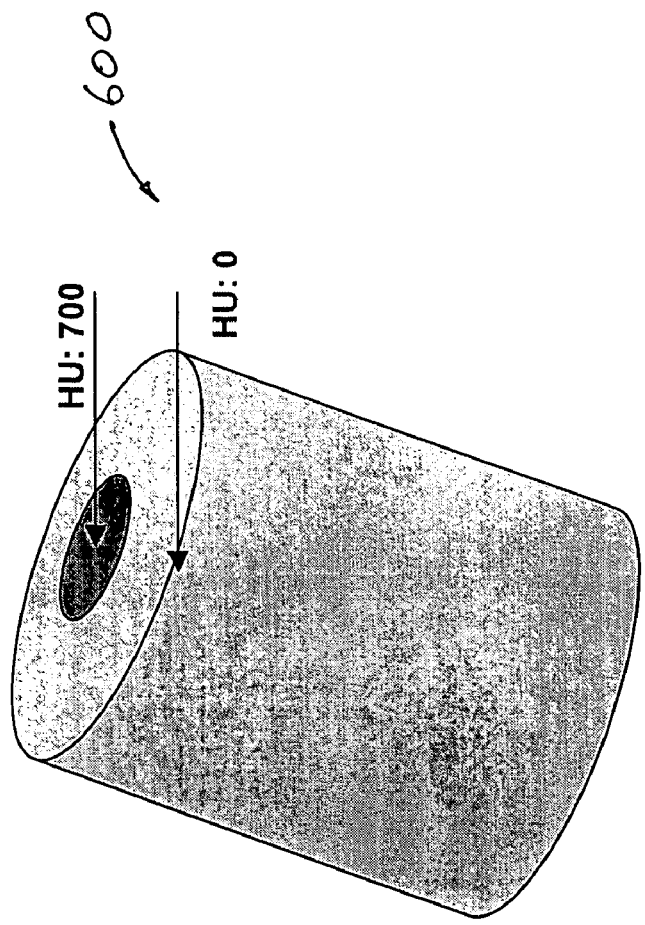
FIG. 13 illustrates an example of a water-bone phantom.
Figure 14:
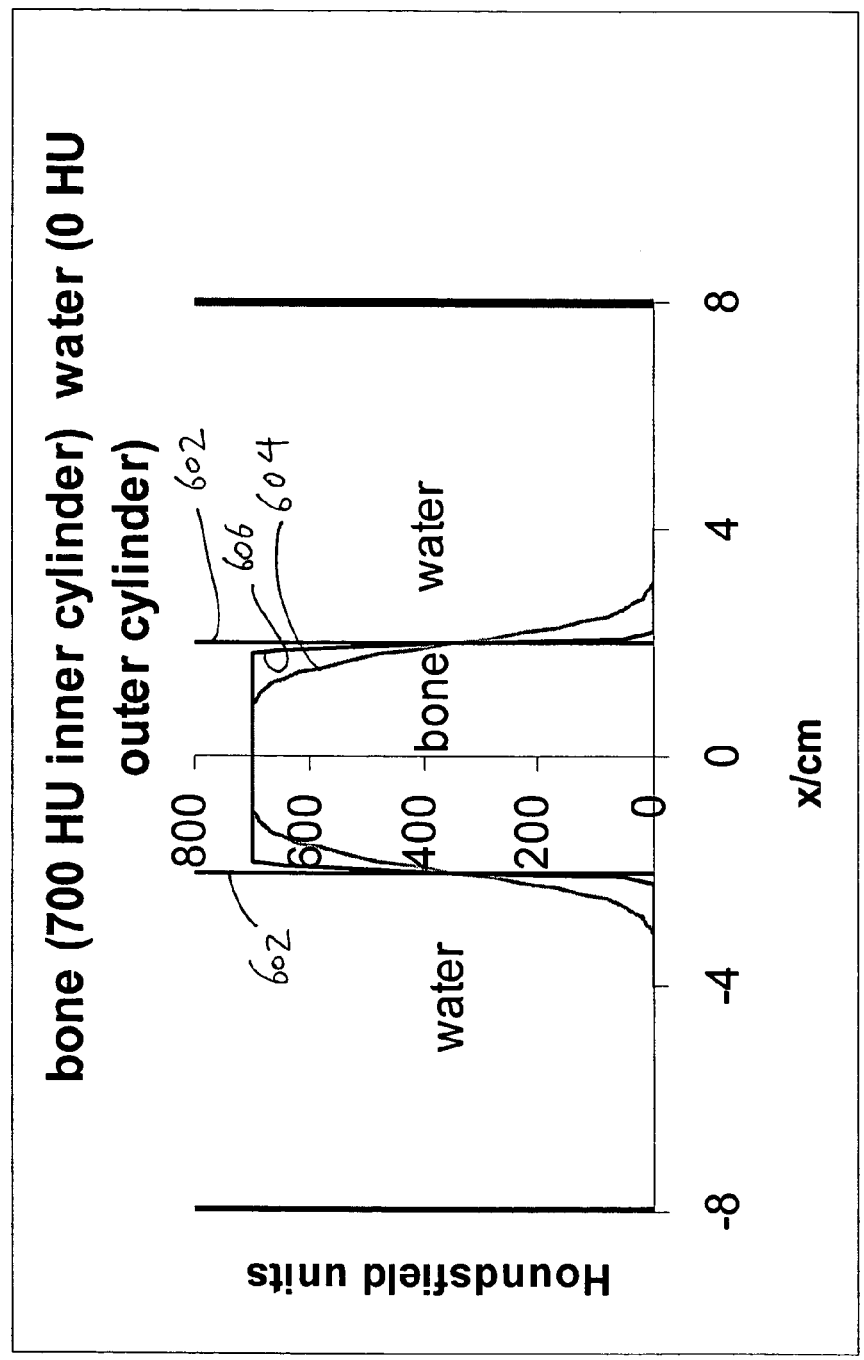
FIG. 14 illustrates an example of a cross-sectional profile of the water-bone phantom of FIG. 13.
Figure 15:
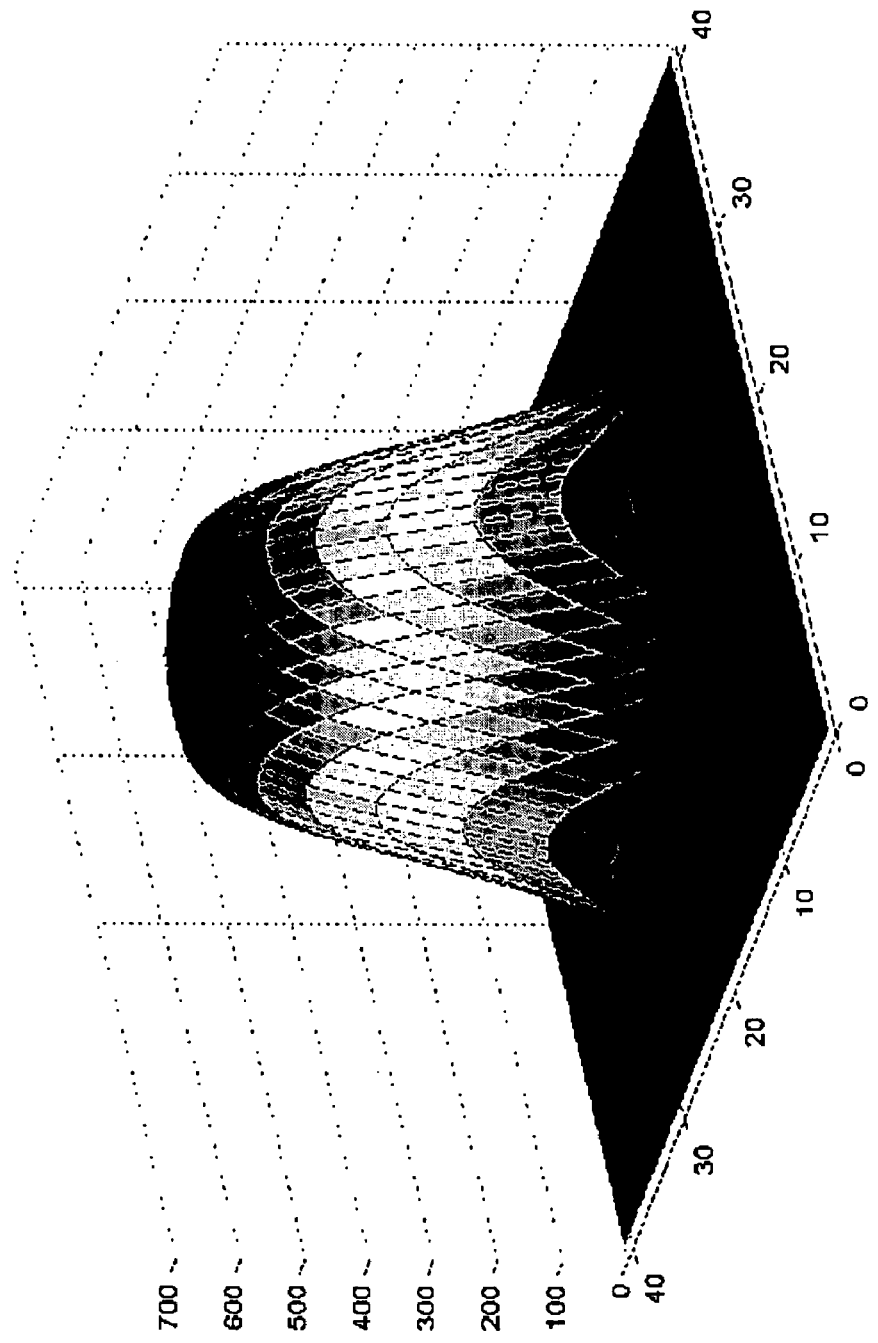
FIG. 15 illustrates an example of an image of the water-bone cylinder of FIG. 13, showing the image having scatter effect before a deconvolution procedure is performed.
Figure 16:
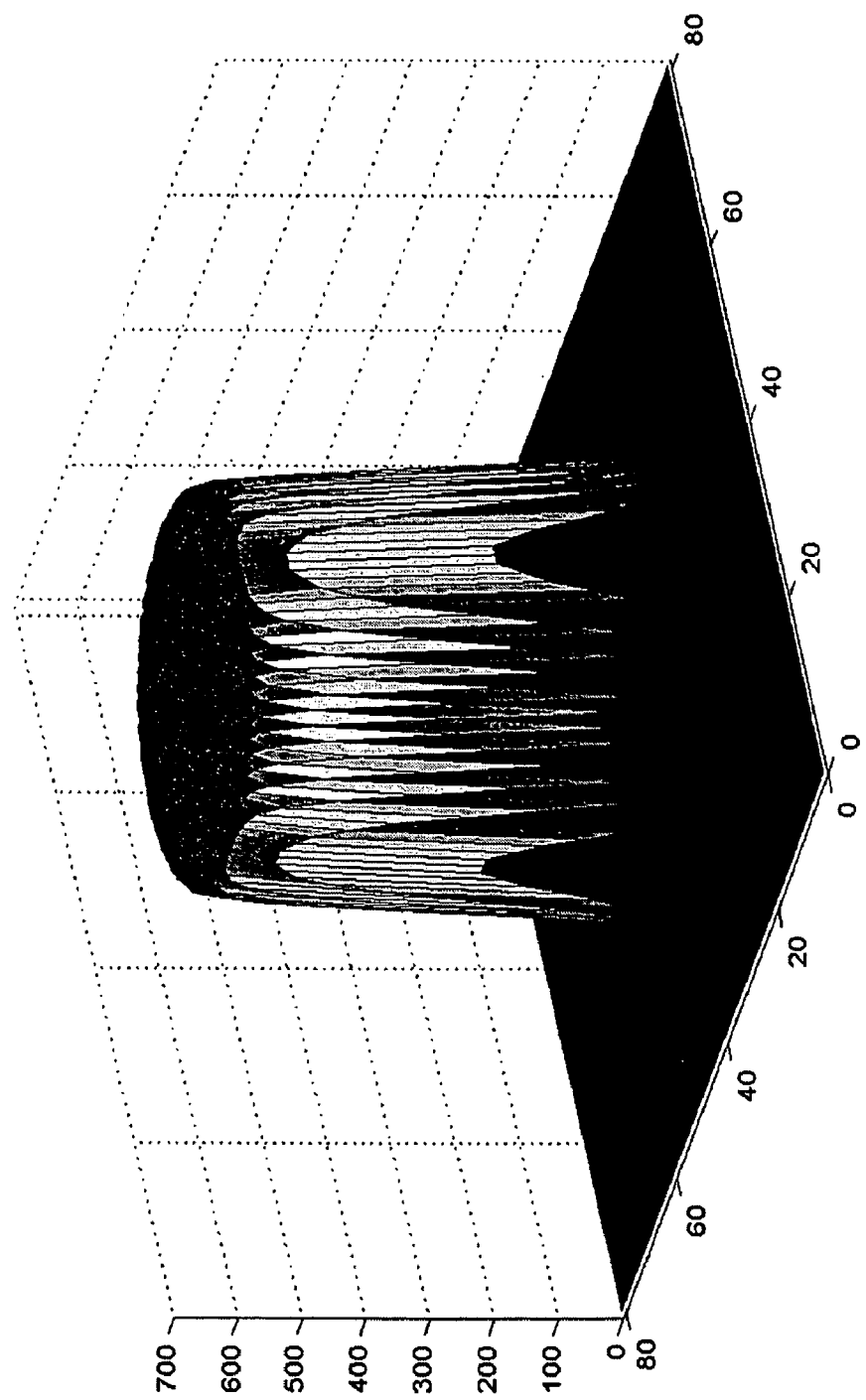
FIG. 16 illustrates an example of an image of the water-bone phantom of FIG. 13, showing the image having reduced scatter effect after a deconvolution procedure is-performed.

In further embodiments, techniques described herein can be used to reduce scatter effect in a CT image due to a thickness or a density of an object for which the CT image is obtained. FIG. 13 illustrates an example of a water-bone phantom 600, which has a cross-sectional profile shown in FIG. 14. The lines 602 in the cross-sectional profile represent an interface between water and bone. In FIG. 14, profile 604 represents an image of the water-bone interface as obtained from the detector 24, and profile 606 represents an image of the water-bone interface after performing a deconvolution procedure on the obtained image data in accordance with embodiments of the invention. As shown in the example, the deconvolution procedure significantly enhance an accuracy of a depiction of the water-bone interface. FIG. 15 shows a three-dimensional image of the water-bone interface as obtained from the detector 24, and FIG. 16 shows a three-dimensional image of the water-bone interface after performing a deconvolution procedure on the obtained image data in accordance with embodiments of the invention. As shown in FIG. 16, the deconvolved image has a sharper contrast and more accurately reflects the original profile of the phantom 600.

Computer System Architecture

Figure 17:
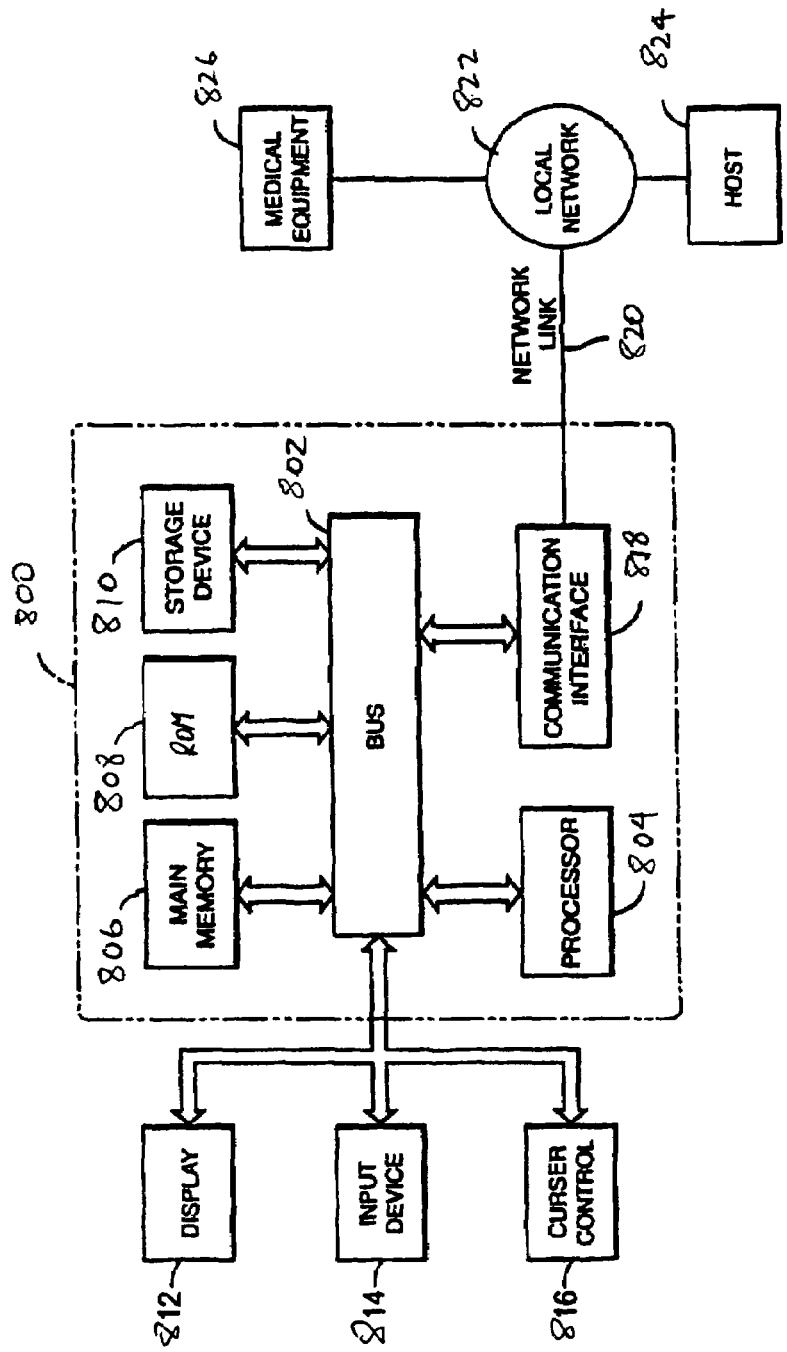
FIG. 17 illustrates a block diagram of a computer system with which embodiments of the invention may be implemented.

FIG. 17 is a block diagram that illustrates an embodiment of a computer system 800 with which embodiments of the invention may be implemented. Computer system 800 includes a bus 802 or other communication mechanism for communicating information, and a processor 804 coupled with the bus 802 for processing information. The processor 804 may be an example of the processor 54, or alternatively, an example of a component of the processor 54, of FIG. 1. The computer system 800 also includes a main memory 806, such as a random access memory (RAM) or other dynamic storage device, coupled to the bus 802 for storing information and instructions to be executed by the processor 804. The main memory 806 also may be used for storing temporary variables or other intermediate information during execution of instructions to be executed by the processor 804. The computer system 800 further includes a read only memory (ROM) 808 or other static storage device coupled to the bus 802 for storing static information and instructions for the processor 804. A data storage device 810, such as a magnetic disk or optical disk, is provided and coupled to the bus 802 for storing information and instructions.

The computer system 800 may be coupled via the bus 802 to a display 87, such as a cathode ray tube (CRT), for displaying information to a user. An input device 814, including alphanumeric and other keys, is coupled to the bus 802 for communicating information and command selections to processor 804. Another type of user input device is cursor control 816, such as a mouse, a trackball, or cursor direction keys for communicating direction information and command selections to processor 804 and for controlling cursor movement on display 87. This input device typically has two degrees of freedom in two axes, a first axis (e.g., x) and a second axis (e.g., y), that allows the device to specify positions in a plane.

Embodiments of the invention are related to the use of computer system 800 for performing deconvolution procedures. According to some embodiments of the invention, such use is provided by computer system 800 in response to processor 804 executing one or more sequences of one or more instructions contained in the main memory 806. Such instructions may be read into the main memory 806 from another computer-readable medium, such as storage device 810. Execution of the sequences of instructions contained in the main memory 806 causes the processor 804 to perform the process steps described herein. One or more processors in a multi-processing arrangement may also be employed to execute the sequences of instructions contained in the main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 804 for execution. Such a medium may take many forms, including but not limited to, non-volatile media, volatile media, and transmission media. Non-volatile media includes, for example, optical or magnetic disks, such as the storage device 810. Volatile media includes dynamic memory, such as the main memory 806. Transmission media includes coaxial cables, copper wire and fiber optics, including the wires that comprise the bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 804 for execution. For example, the instructions may initially be carried on a magnetic disk of a remote computer. The remote computer can load the instructions into its dynamic memory and send the instructions over a telephone line using a modem. A modem local to the computer system 800 can receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card or a modem to provide a data communication connection to a corresponding type of telephone line. As another example, the communication interface 818 may be a local area network (LAN) card to provide a data communication connection to a compatible LAN. Wireless links may also be implemented. In any such implementation, the communication interface 818 sends and receives electrical, electromagnetic or optical signals that carry data streams representing various types of information.

The network link 820 typically provides data communication through one or more networks to other devices. For example, the network link 820 may provide a connection through local network 822 to a host computer 824 or to medical equipment 826 such as a radiation beam source or a switch operatively coupled to a radiation beam source. The data streams transported over the network link 820 can comprise electrical, electromagnetic or optical signals. The signals through the various networks and the signals on the network link 820 and through the communication interface 818, which carry data to and from the computer system 800, are exemplary forms of carrier waves transporting the information. The computer system 800 can send messages and receive data, including program code, through the network(s), the network link 820, and the communication interface 818.

Although the embodiments of the systems and methods have been described with reference to correcting for scatter in CT images, it should be understood that the systems and methods described herein may also be implemented to correct scatter in other types of images, such as images generated using a laminar tomography procedure, a MRI procedure, a PET procedure, or other imaging procedures. Also, in other embodiments, any of the techniques described herein can be used to correct scatter in dose images.

Although the above embodiments have been described with reference to correcting scatter in images, the scope of the invention should not be so limited. In other embodiments, any of the embodiments described herein can be used in other applications. For examples, in some embodiments, any of the above described techniques can be used to perform deconvolution of depth dose curves and transverse profiles to obtain spectra and fluence. In such cases, the output function ϕ(x) represents a depth-dose curve measurement obtained using an ionization chamber, and the input function ρ(u) represents an idealized depth-dose curve. In other embodiments, any of the above described techniques can be used to perform deconvolution of dosimeter influence to profiles. In further embodiments, any of the above described techniques can be used to remove back-scatter in photon depth dose curves. Also, any of the deconvolution techniques described herein can also be used in other medical or non-medical applications that involve deconvolving two or more variables.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. For example, the operations performed by the processor 54 can be performed by any combination of hardware and software within the scope of the invention, and should not be limited to particular embodiments comprising a particular definition of "processor". In addition, the term "image" as used in this specification includes image data that may be stored in a circuitry or a computer-readable medium, and should not be limited to image data that is displayed visually. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for correction of scatter in an image, comprising:
   receiving data of an image having a scatter characteristic;
   performing a deconvolution procedure on the data using Hermite expansion technique; and
   generating modified image data based on a result from the step of performing;
   wherein the modified image data is generated by solving the equation $$p(x) = \varphi(x) + \int \sum_{n=1}^{\infty} (-1)^n s^{2n}(2^n-1)(4^n n!) - 1 H_{2n}((x-u)/s) K(s, x-u) \varphi(u) du.$$

2. The method of claim 1, wherein the performing the deconvolution of the data comprises convolving the data with a kernel K.

3. The method of claim 1, wherein the performing the deconvolution procedure comprises determining a correction function.

4. The method of claim 3, wherein the determining the modified image data comprises adding the correction function to the data.

5. The method of claim 1, wherein the performing comprises using one or more Hermite polynomial, each of the one or more Hermite polynomial is determined using an order of a derivative of a Gaussian.

6. A method for correction of scatter in an image, comprising:
   receiving data of an image having a scatter characteristic;
   performing a deconvolution procedure on the data using Hermite expansion technique; and
   generating modified image data based on a result from the step of performing;

wherein the performing comprises using one or more Hermite polynomial, each of the one or more Hermite polynomial is determined using an order of a derivative of a Gaussian, and wherein the one or more Hermite polynomial is determined by the equation $$H_n(u-x, \sigma_0) = n! \sum_{m=0}^{N} (-1)^m \frac{1}{m!(n-2m)!} 2^{n-2m}((u-x)/\sigma_0^2)^{n-2m}$$

with $N = \frac{n}{2}$ and $n = 2, 4, 6, \ldots$.

7. The method of claim 1, wherein the deconvolution procedure is performed using a characteristic parameter.

8. The method of claim 7, wherein the characteristic parameter is associated with a scatter effect due to a thickness or a density of an object for which the image is obtained.

9. The method of claim 7, wherein the characteristic parameter is associated with a scatter effect due to a collimator that is used to generate the data.

10. A system for correction of scatter in an image, comprising:
    means for receiving data of an image having a scatter characteristic;
    means for performing a deconvolution procedure on the data using Hermite expansion technique; and
    means for generating modified image data based on a result from the step of performing;
    wherein the means for performing and the means for generating are configured to solve the equation $$p(x) = \varphi(x) + \int \sum_{n=1}^{\infty} (-1)^n s^{2n}(2^n-1)(4^n n!) - 1 H_{2n}((x-u)/s)K(s, x-u)\varphi(u)du.$$

11. A method for correction of scatter in an image, comprising:
    providing an output function representing a feature of an image having a scatter characteristic;
    determining a correction function using one or more characteristic parameter; and
    adding the correction function to the output function to determine a resulting function, the resulting function representing a feature of an improved image having a reduced scatter characteristic;
    wherein the determining the correction function comprises solving the equation $$p(x) = \varphi(x) + \int \sum_{n=1}^{\infty} (-1)^n s^{2n}(2^n-1)(4^n n!) - 1 H_{2n}((x-u)/s)K(s, x-u)\varphi(u)du.$$

12. The method of claim 11, wherein the determining the correction function comprises performing a convolution procedure on the output function.

13. The method of claim 11, wherein the determining the correction function comprises using one or more Hermite polynomial.

14. The method of claim 13, wherein each of the one or more Hermite polynomial is determined using an order of a derivative of a Gaussian.

15. A method for correction of scatter in an image, comprising:
    providing an output function representing a feature of an image having a scatter characteristic;
    determining a correction function using one or more characteristic parameter; and
    adding the correction function to the output function to determine a resulting function, the resulting function representing a feature of an improved image having a reduced scatter characteristic;
    wherein the determining the correction function comprises using one or more Hermite polynomial, and wherein the one or more Hermite polynomial is determined by the equation $$H_n(u-x, \sigma_0) = n! \sum_{m=0}^{N} (-1)^m \frac{1}{m!(n-2m)!} 2^{n-2m}((u-x)/\sigma_0^2)^{n-2m}$$

with $N = \frac{n}{2}$ and $n = 2, 4, 6, \ldots$.

16. The method of claim 11, wherein the feature of the image and the feature of the improved image each comprises a resolution or a contrast.

17. The method of claim 11, wherein the output function comprises a value obtained from an image detector.

18. The method of claim 11, wherein one of the one or more characteristic parameter is associated with a scatter effect due to a thickness or a density of an object for which the image is obtained.

19. The method of claim 11, wherein one of the one or more characteristic parameter is associated with a scatter effect due to a collimator that is used to generate the image.

20. The method of claim 11, wherein the correction function comprises a correction value that is determined empirically or experimentally.

21. A system for correction of scatter in an image, comprising:
    means for obtaining an output function representing a feature of an image having a scatter characteristic;
    means for determining a correction function using one or more characteristic parameter; and
    means for adding the correction function to the output function to determine a resulting function, the resulting function representing a feature of an improved image having a reduced scatter characteristic;
    wherein the means for determining the correction function is configured to solve the equation $$p(x) = \varphi(x) + \int \sum_{n=1}^{\infty} (-1)^n s^{2n}(2^n-1)(4^n n!) - 1 H_{2n}((x-u)/s)K(s, x-u)\varphi(u)du.$$

22. The method of claim 1, wherein the act of performing the deconvolution procedure comprises using a variable determined using an order of a derivative of a Gaussian.

23. The system of claim 10, wherein the means for performing a deconvolution procedure is configured to obtain a variable determined using an order of a derivative of a Gaussian.

24. The system of claim 21, wherein the means for determining the correction function is configured to determine one or more Hermite polynomial.

* * * * *

UNITED STATES PATENT AND TRADEMARK OFFICE
CERTIFICATE OF CORRECTION

| | |
|---|---|
| PATENT NO. | : 7,471,813 B2 |
| APPLICATION NO. | : 10/956623 |
| DATED | : December 30, 2008 |
| INVENTOR(S) | : Waldemar Ulmer and Wolfgang Kaissl |

It is certified that error appears in the above-identified patent and that said Letters Patent is hereby corrected as shown below:

On the Title page, under References Cited, insert --International Search Report, March 16, 2006 for PCT/US2005/35160 (Publication No. WO/2006/039471 A3)--.

Signed and Sealed this

Twenty-first Day of April, 2009

JOHN DOLL
*Acting Director of the United States Patent and Trademark Office*